(12) United States Patent
Shaw

(10) Patent No.: US 11,305,454 B2
(45) Date of Patent: Apr. 19, 2022

(54) MOVEABLE SAW FENCE AND SAW SUPPORT

(71) Applicant: William Charles Shaw, Ridgefield, CT (US)

(72) Inventor: William Charles Shaw, Ridgefield, CT (US)

( * ) Notice: Subject to any disclaimer, the term of this patent is extended or adjusted under 35 U.S.C. 154(b) by 0 days.

(21) Appl. No.: 17/084,358

(22) Filed: Oct. 29, 2020

(65) Prior Publication Data
US 2021/0129372 A1 May 6, 2021

Related U.S. Application Data

(60) Provisional application No. 62/927,973, filed on Oct. 30, 2019.

(51) Int. Cl.
*B27B 27/08* (2006.01)

(52) U.S. Cl.
CPC .................................. *B27B 27/08* (2013.01)

(58) Field of Classification Search
CPC .... B23D 45/044; B23D 47/005; B23D 47/02; B23D 45/048; B23D 47/025; B23D 47/126; B23D 59/006; B27B 27/08; B27B 5/188; B27B 5/208; B27B 27/04; B27B 5/29; B27G 19/02; Y10T 83/7693; Y10T 83/7697; Y10T 83/7763; Y10T 83/7772
USPC ..... 83/468.2, 471.2, 471.3, 473, 477.1, 489, 83/486, 468.1, 490, 581, 630, 468.3, 491, 83/563, 522.1, 466, 452, 471, 397, 468, 83/522.11, 522.18; 144/4.3, 286.1, 286.5, 144/253.1; 248/277.1
See application file for complete search history.

(56) References Cited

U.S. PATENT DOCUMENTS

| | | | | |
|---|---|---|---|---|
| 752,406 | A * | 2/1904 | Nicholas | B27G 5/02 83/766 |
| 4,283,977 | A * | 8/1981 | Batson | B23D 47/04 269/203 |
| 4,875,399 | A * | 10/1989 | Scott | B23D 45/044 83/468.3 |
| 5,257,570 | A | 11/1993 | Shiotani et al. | |
| 5,791,224 | A * | 8/1998 | Suzuki | B23D 45/044 83/471.3 |
| 6,425,309 | B1 | 7/2002 | Stumpf et al. | |
| 6,543,323 | B2 | 4/2003 | Hayashizaki et al. | |

(Continued)

FOREIGN PATENT DOCUMENTS

| | | |
|---|---|---|
| EP | 2070622 B1 | 9/2013 |
| WO | 2010/144630 A1 | 12/2010 |

*Primary Examiner* — Ghassem Alie
(74) *Attorney, Agent, or Firm* — Gordon & Jacobson, P.C.

(57) ABSTRACT

A miter saw includes a base, a horizontal table supported by the base, an arm pivotably coupled to the base at a rear pivot point configured to permit the arm to pivot about a horizontal axis, a circular saw blade arbor supported by the arm at a location spaced forward from the rear pivot point, and a circular saw blade supported by and concentric with the arbor. The saw blade is configured to be driven to cut a workpiece on the horizontal table. The rear pivot point permits the blade to move along an arc in a vertical plane perpendicular to the horizontal table. Between a rear edge of the arbor and a rear edge of the blade, the arm extends substantially above the height of the blade to allow substantially the entire blade area rearward of the rear edge of the arbor to be available for cutting the workpiece.

14 Claims, 19 Drawing Sheets

(56) References Cited

U.S. PATENT DOCUMENTS

| | | | |
|---|---|---|---|
| 7,930,961 B2 | 4/2011 | Kozina et al. | |
| 8,020,477 B2 | 9/2011 | Aoyama | |
| 8,539,870 B2 * | 9/2013 | Behr | B23D 47/08 |
| | | | 83/471.3 |
| 8,776,654 B2 * | 7/2014 | Glomb, Sr. | B23D 59/002 |
| | | | 83/468 |
| 8,887,606 B2 | 11/2014 | Inai | |
| 9,844,822 B2 | 12/2017 | Cheng | |
| 2002/0152867 A1 * | 10/2002 | Meredith | B27B 5/29 |
| | | | 83/471.3 |
| 2003/0101971 A1 * | 6/2003 | Farrar | F02M 37/106 |
| | | | 123/510 |
| 2005/0262985 A1 * | 12/2005 | Talesky | B27B 27/08 |
| | | | 83/581 |
| 2008/0276773 A1 * | 11/2008 | Togare | B23D 47/02 |
| | | | 83/34 |
| 2014/0318341 A1 * | 10/2014 | Fait | B27B 27/08 |
| | | | 83/477 |
| 2015/0114196 A1 | 4/2015 | Meredith et al. | |
| 2020/0361111 A1 * | 11/2020 | Suthar | B23D 47/025 |

\* cited by examiner

MOVEABLE SAW FENCE AND SAW SUPPORT

CROSS-REFERENCE TO PRIOR APPLICATION

This application claims benefit to U.S. Provisional Ser. No. 62/927,973, filed Oct. 30, 2019, which is hereby incorporated by reference herein in its entirety.

BACKGROUND

1. Field

The present disclosure relates to saws, and, more particularly, to miter saws with a workpiece fence, and even more particularly, to miter saws with enlarged blade cutting area to maximize the size of material that can be cut for a given saw blade size.

2. State of the Art

Various types of miter saws exist. The most basic miter saw is a saw in which a circular saw blade can move along a cutting pathway defined by an arc in a chopping action. Such saws have a fixed vertical fence and a horizontal table against which a workpiece is placed for cutting by the saw blade. Typically, the saw blade travels about a pivot point located behind a vertical saw fence. The plane of the arc defines a cutting plane that can be pivotally adjusted about a vertical axis to allow for a miter cut. In addition to the function of the aforementioned basic miter saw, some miter saws (known as compound miter saws) also have the ability to bevel or tilt the blade in either one direction or both left and right relative to the vertical plane of the arc. This allows for a compound cut where a user can set both a miter angle and a bevel angle for the cut.

In addition to the functionality of compound miter saws, other saws (known as sliding miter saws) add the ability for the blade to slide fore and aft following a plane of a set miter angle. Sliding compound miter saws usually have a shorter (vertically) fence than a basic or compound miter saw, since sliding miter saws are designed to be used to primarily cut a workpiece "on the flat", that is, with the wider side down on the table. The range of fore and aft movement can increase the width of material lying flat on the saw's table that can be cut by a given blade since the entire blade can move across the width of the material. Consequently, the blade used can be smaller if the saw is not used for cutting relatively thick material, like a "4×4", which has nominal measurements of 3½ inch×3½ inch and needs a depth of cut of at least 3½ inches. However, sliding miter saws are generally larger and heavier than all of the other miter saw types. Also, sliding miter saws generally are the most expensive type of miter saws.

Regardless of the foregoing distinctions in functionality among miter saws, all miter saws have common features: a table 102, a fence 104, a drivable saw blade 106, and a support structure 108 for the saw blade 106 to move in a cutting path or arc through a workpiece cutting area 114, as is shown schematically in Prior Art FIG. 1A. The fence extends perpendicular to the plane of the blade when the blade is set at zero degrees on the miter scale. The support structure 108 includes a base 108a and an arm 108b that is pivotally coupled to the base 108a to permit the blade 106 and the arm 108b to pivot about a vertical axis A-A, as well as a horizontal axis B-B (into the page in FIG. 1A). Pivoting about axis B-B allows the blade to move along an arc from a first, starting position to a second, ending position between which a workpiece can be cut when the blade is driven (e.g., by a motor or other drive means, not shown).

The blade 106 is also supported at its center by a blade arbor 110, which is coupled to a front or forward portion of the arm 108b. A blade arbor is the shaft, spindle, or mandrel to which the circular saw blade mounts. The arbor connects to a motor or other drive unit coupled to the arbor directly or indirectly with a transmission that may include a belt or gears. The rear portion of the arm 108b is pivotally connected to the base 108a. As shown in FIG. 1A, because of the height of the arm 108b relative to the table 102, the height of the workpiece that can be cut is limited to the height of the area 114 since the arm 108b would hit into a taller workpiece in the second, end position. The height of the arm 108b above the table 102 is fixed to allow a certain range of crown moulding sizes and base moulding sizes to be cut for a given saw blade without interference from the arm 108b or the arbor 110. Note that in FIG. 1A, a line W1 represents the width of the largest crown moulding with a 45 degree spring angle that can be cut in the sprung position with the saw 100 without interference between the moulding and the arbor 110 and/or the arm 108b. In the second position shown in FIG. 1A, the arm 108b and arbor 110 are spaced vertically from the table 102 a sufficient distance so that the arc of travel 110a of the arbor 110 does not interfere with the upper left edge of the cut area 114 and does not interfere with a crown moulding set in the sprung position along line W1. It will be appreciated that if the vertical spacing between the table 102 and the arm 108b or the arbor 110 was reduced from that shown in FIG. 1A, the arbor 110 would interfere with a crown molding workpiece set at the spring angle of 45 degrees and the am 108b would impinge into the cut area 114.

The table 102 is a flat horizontal surface. As shown in FIG. 1B, the table 102 has left and right non-movable portions 102a, 102b, and a central rotatable section 102c, which defines a slot 103 configured to partially receive a bottom portion of the blade 106 below the surface of the table 102 in the second, end position. The rotatable portion 102c is configured to rotate with the saw blade 106 around a vertical axis A-A to allow for an angled or miter cut. The non-movable portions 102a and 102b are fixed relative to the base and cannot move fore and aft. The fence 104 is a vertical member that extends vertically perpendicular from the table 102. The fence 104 is fixed with respect to the table 102 and base 108a. As shown in FIG. 1B, the fence 104 may have left and right portions 104a and 104b that extend respectively from non-movable portions 102a, 102b.

As shown in FIG. 1A, the blade 106 and the arm 108b are configured to swing through an arc about axis B-B. As the blade 106 swings through its arc it needs to plunge partially below the top surface of table 102 in order to cut all the way through the workpiece. Specifically, the path of the blade 106 needs to pass through a fence/table intersection 112 in order to cut through a square-edged workpiece in area 114 that is flat on the table 102 and extends up against the fence 104 in a normal cut position, e.g., a base moulding. This means that to fully cut through the entire workpiece in area 114, some portion (i.e., of the bottom) of the blade 106 in the second position will be received in slot 103 and extend below the surface of table 102 and behind the fence 104, as shown in FIG. 1A. Most saws permit the blade 106 to plunge into slot 103 to a plunge depth of about 1 to 2 inches below the top surface of the table 102. This allows for a relatively wide and thick workpiece to be cut, since the blade arbor 110 and drive unit (not shown) will be located vertically as high as possible.

Though not shown in FIG. 1A, the fence 104 may have two horizontally spaced sections, one on each side of a central space through which the swinging saw blade 106 and arm 108b move during cutting of a workpiece. Such fence sections are fixed in the same vertical plane with each other (i.e., they are not offset fore and aft). Each fence section has an upper portion that can be moved (e.g., can slide) left or right to provide clearance for the blade to tilt/bevel left and right when making bevel or compound cuts.

With regard to crown moulding, there are two standard ways to cut a miter on a crown moulding with the current miter saws. The first way is to cut the crown moulding in what is called "in position", where the crown moulding is placed upside down against the saw table and fence so that both of the bedding feet of the moulding (the parts of the crown moulding which are designed to contact the wall and ceiling) are contacting the table and fence. The second way is to cut the crown moulding "on the flat", with the back of the moulding facing against the saw table.

When cut in position, the crown moulding will be positioned between the table and the fence at the proper angle that a designer of the moulding intended the moulding to sit at on the wall. This angle is known as the "spring angle" and is the angle between the back of the crown moulding and the wall. This angle is typically 38 degrees or 45 degrees, but can be any angle the designer chooses. The horizontal distance from a 90 degree wall/ceiling intersection to the top outer most edge of the crown moulding is called the "ceiling projection." If the crown moulding is to be coped for an inside corner, the crown moulding is typically cut at 45 degrees. For miter cuts the angle can vary if the angle between the walls at the corner is not a perfect 90 degrees. For example, if the angle between the walls at an inside corner is 89 degrees, the crown moulding may be cut at 45.5 degrees.

A proper way to cut crown moulding in position is to use a crown stop, which, at least in theory, holds the crown moulding at an angle which should be the spring angle. With the saw set to the correct miter angle, and the workpiece held in place, the cut is made. Typical crown stops are simply adjusted so as to abut the moulding so that the moulding is positioned by feel and by eye between the table and the fence. If the fence is not positioned exactly where it should be, the cut will be off. The crown stop is to be positioned exactly the ceiling projection measurement away from the fence.

Moreover, some carpenters do not use a crown stop to hold the crown moulding in position. Instead, some carpenters would rather hold (manually) the crown moulding at the proper wall and ceiling projection by rocking it into position using only the bedding feet as a guide, and maybe making a pencil mark on the table and or fence of the saw for repeat cuts. However, it can be seen that as the saw blade starts the cut it is also exerting downward pressure on the crown moulding. This downward pressure can make the moulding slide down and away from the fence and out onto the table. Moreover, this sliding can be exacerbated if the blade is dull and/or the wood is hard. Even a downward movement of the moulding of 1/16 inch will cause the resulting cut to be incorrect. It is hard to tell if a crown miter cut is off just by looking at it; which may result in the installer coping or installing the mitered workpiece with an incorrect cut, making fitment harder. Also, besides being prone to the foregoing problems, cutting in position without a crown stop is also more dangerous since the user is holding onto the workpiece without the help of a crown stop.

The second way to cut a crown miter is called "cutting on the flat" with a compound cut where the crown moulding is laid flat on the miter saw table and up against the fence, and the saw miter and bevel angles are set accordingly. This is more difficult than it may seem since a user must measure the corner angle first and then, knowing the spring angle, calculate both the miter and bevel angles. Then, the user must set both miter and bevel angles, which is also harder than it may seem since the angle typically involves tenths of a degree. For example, in the case above with the corner being measured at 89 degrees and say a spring angle of 38 degrees, the resulting miter angle and bevel angle would be 32.1 and 34.2 degrees, respectively. Setting the miter angle to 32.1 degrees is not too hard, since the miter scale is relatively large. However, setting the bevel angle to 34.2 is a guess at best, since the bevel angle scale on the saw is so much smaller than the miter scale. That is, there is no accurate or precise way to set the calculated bevel angle. Thus, cutting in position is advantageous over cutting on the flat because a user only has to determine and set one angle (miter angle) using the more accurate miter angle scale on the saw. However, when cutting on the flat, two angles have to be calculated and set.

Another consideration that can complicate cutting on the flat is that a lot of wooden crown moulding is not flat. Indeed, most wooden crown mouldings cup and or twist. This is caused by tension in the wood. When the initially-flat board is being shaped into to the desired moulding profile very little wood is removed from the back in a flatting/smoothing operation, then the front or face of the moulding is cut, which is where most of the wood is removed. The deeper the profile, the deeper the cut. When more wood is removed from one side (i.e., the front) of a board than the other (i.e., the back) tension in the wood is created or released. The tension can be mild or strong and is caused by the grain direction, how it grew in the forest, as well as tension induced when the board was dried in a kiln. Since the flat back is stronger than the front the moulding, the moulding tends to cup or curl toward the face, i.e., the back surface will be convex. Twist is a rotation along the board usually from one end to the other. Twist is usually gentle over say a 12-foot board. However, cupping is across the back and that is the part used to reference a cut when cutting on the flat. With the back of the moulding cupped (i.e., convex), it can be seen that it is hard to hold the board flat on the saw table and get a consistent cut. For example, when the cupped back of the crown moulding is placed down on the table to make a compound cut (as when cutting on the flat), the crown moulding tends to rock on its back, making it difficult to get an accurate cut. Also, seeing a pencil mark and lining it up for the cut is also harder when doing a compound cut because of the limited sight line with the blade at a certain miter and bevel angle.

With regard to smaller base moulding (e.g., with a width less than 6.5 inches), typically smaller base moulding is cut "in position", that is, in the same position it will be installed in on a wall, i.e., with the widest dimension extending vertically facing the fence. When the base moulding is cut in position, it may be easier for a user to see the user's cut mark and line it up with the blade. Moreover, cutting the moulding in position is easier on the blade and motor than cutting "on the flat" (lying down) because the direction of the cut is from the top down, instead of cutting through the full width of the board all at once (a plunge cut) as done on a non-slide saw that bevels. Slide saws cut from one edge to the other when using the slide action, which is easier than a plunge cut. However, since it is a bevel cut, it is hard to set the angle accurately on the small scale.

Also, when cutting a miter in smaller base moulding in the vertical position the user is using the miter scale of the saw, which is easier to set more accurately than the relatively smaller bevel gauge used when cutting material on the flat. For cutting a miter on wider base moulding (i.e., above 6.5 inches), it is generally necessary to cut on the flat (e.g., using a sliding miter saw) using the smaller and less accurate bevel angle scale. Moreover, the visibility of the cut is hampered by the tilting of the blade/motor assembly. Indeed, no commercially available 12-inch miter saw on the market is capable of cutting material in position having a width (measured vertically from the table) greater than 6.5 inches (e.g., base moulding having height of 6.5 inches held in the vertical position against the fence). Thus, any base moulding with a width larger than 6.5 inches generally has to be cut on the flat with any conventional miter saw. Slide saws were designed to cut larger base and crown mouldings which could not be cut with the standard or compound miter saws due to their cutting limitations. This is a solution that created its own problems. Example, having to use the less accurate bevel gauge for miter cuts on base moulding, having to calculate and set both miter and bevel angles for every mitered corner for crown moulding, having to deal with cupped crown moulding and trying to reference the cupped surface on the flat table.

SUMMARY

Various parameters have been identified that can limit the cutting area of a miter saw, specifically for cutting base or crown moulding. The size of the saw blade can limit the size of the cutting area, and thus limit the size of the material that can be cut by the blade. In general, the bigger the blade diameter, the larger the cutting area and larger the cross sectional dimension of the material that can be cut. For example, a typical 12-inch diameter saw blade plunges down under the table surface about 1 inch to 2 inches, which leaves about 3¾ inches of blade radius between the surface of the table and the blade arbor and drive unit. This 12-inch blade diameter and depth below the table is often used to allow a "4×4" piece of lumber (which actually measures 3½ inches×3½ inches) to be cut completely through. Also, with a 12-inch blade, when the blade is all the way down in the second position and through the slot (e.g., slot 103 in table 102) in the table and the blade is plunged about 1 inch to 2 inches below the table surface, the blade 106 can cut a board (lying flat down on the table) that is about 8 inches wide. If the same 12-inch blade could be plunged further, it would be possible to could cut a wider board lying flat, but not as thick a board.

Another parameter that can limit the cutting area of a miter saw is the plunge depth, i.e., the distance that the blade is permitted to plunge beneath the surface of the table. Generally, the deeper the plunge depth, the deeper (and therefore heavier) the base casting of the saw must be to allow for clearance between the blade and A-A axis pivot point for the table. However, the greater the plunge depth, the greater is the width of the cutting area of the saw.

Moreover, there are mechanical constraints such as the blade arbor and/or drive mechanism (e.g., gearbox, belt, shafts, motor and motor housing) that drives the saw blade which can also limit saw blade clearance when cutting, as can any supporting structure coming from the pivot point out to the blade arbor/drive unit. For example, as a user rotates the arm 108b and blade 106 about axis A-A, e.g., to cut a 45-degree miter, the blade arbor and drive mechanism or unit gets closer to the fence, which can limit the thickness of base moulding and the width of crown moulding that can be cut in position. For example, FIG. 1B shows a top view of the blade 106, arbor 110, and a drive unit positioned at two positions relative to the right and left fences 104a and 104b. In a first position, the blade 106, arbor 110, and drive unit are set at 90 degrees with respect to a plane through the right and left fences 104a and 104b. In the first position, the distance between the saw arbor 110 and the fences 104 is about 2.5 inches. The blade 106, arbor 110, and the drive unit can be rotated about 45 degrees about axis A-A from the first position to a second position shown in FIG. 1B. In the second position shown in FIG. 1B, the distance between the right fence 104 and the arbor 110 is about 1.25 inch, which is less than the spacing in the first position.

The location of the fence of a standard or compound miter saw has always been fixed, so at a certain second position or full depth of cut, the blade cuts through the table/fence intersection. This arrangement leaves a portion of the blade behind the fence that is not involved in the cut.

To address some of the foregoing issues, in accordance with one aspect of the disclosure, a miter saw is described which maximizes the size of moulding that can be cut in position by a given saw blade. In embodiments, the saw includes a base with a horizontal table, an arm having a first end pivotably coupled to the base at a rear pivot point, a circular saw blade arbor supported by the arm at a location spaced forward from the first end, and a circular blade supported by the arbor and concentric with the arbor. The circular blade is configured to be driven by any conventional drive unit, such as an electric motor connected to the blade via any transmission system, including, for example, a gear drive and a belt drive. The rear pivot point permits the blade to swing in an arc in a vertical plane. Between at least the rear edge of the arbor and a rear edge of the blade, the arm extends substantially above (above 90%) the height or diameter of the blade to allow substantially all of the blade surface rearward of the blade arbor to be used in the cutting action. This miter saw configuration uses substantially the full diameter (height above the table) of the blade for cutting a base board standing up against the fence or crown moulding cut in position. This also facilitates miter cutting larger dimensional material using the miter scale (rather than making bevel/plunge cuts) and the easier cutting action of progressing through the workpiece from top to bottom and better line of sight.

In accordance with another aspect of the disclosure, a crown stop system is provided for a miter saw having a base with a table and a fence. The crown stop system includes a movable stop that is configured to be set in spaced relation to the fence. The crown stop is configured to be secured in position to the table or the base, such as with adjustable clamps. The crown stop system includes a linear measurement scale affixed to the table to facilitate setting the relative position between the crown stop and the fence. For cutting crown moulding in position, the crown stop should be set exactly at the ceiling projection away from the fence. This ensures that the crown moulding is cut at the correct wall and ceiling projection, and eliminates the aforementioned problems of manually holding the workpiece only by hand during the cut or simply setting a crown stop by eye or feel.

In accordance with another aspect of the disclosure, a movable fence system for a miter saw is provided. The system includes a saw base supporting a horizontal saw table and a fence configured to move relative to the table and the base in a fore and aft direction. The base may be the base of the miter saw described above in accordance with this disclosure or may be the base of other miter saws. It will be appreciated that moving the fence rearward toward the pivot location of the arm and further from the blade arbor can increase the cutting area of the blade. In embodiments, the table and the fence will include a left table and a left fence on a left side of the base (to the left of the blade and arm) and a right table and a right fence on a right side of the base (to the right of the blade and arm). In embodiments, each right and left fence is movable fore and aft relative to each corresponding right and left table, which are fixed relative to the base. In the case of right and left fences, the right and left fence may be displaceable fore and aft independently of one another or can be moved together.

In accordance with another aspect of the disclosure, a movable fence and table system for a miter saw is provided that includes a fixed base, at least one table and at least one fence that are displaceable relative to the fixed base in a fore and aft direction. The base may be the base of the miter saw described above in accordance with this disclosure or may be the base of other miter saws. In embodiments, there will be a left table and a left fence on a left side of the base (to the left of the blade and arm) and a right table and a right fence on a right side of the base (to the right of the blade and arm). Each fence and movable table are fixed together and configured to move unitarily fore and aft relative to the base. In the case of right and left fences and tables, the right table and fence are configured to operate and move independently of the left table and fence, or they can move together as a unit. In embodiments, at least one of the fence is permitted to move rearward toward the pivot location of the arm behind the rear edge of the blade.

In embodiments, the aforementioned crown stop is removably coupled to the fence such that as the fence moves fore and aft, the crown stops move in unison in fore and aft. In an embodiment, the crown stop is configured to be set and attached to the movable table at a certain measured distance from the fence. In a configuration where the crown stop is set at a certain distance from the fence and attached (e.g., fixedly with a clamping mechanism) to the movable table, the crown stop can move together with the fence and table if the table and fence position relative to the base is adjusted. In embodiments, the crown stops include left and right crown stops removably coupled respectively to left and right movable fences. In embodiments, left crown stop is coupled to the left fence via a left table, which may be movable in a fore and aft direction, and the right crown stop is coupled to the right fence via a right table, which also may be movable in a fore and aft direction.

In embodiments, the movable table has a linear measurement scale (e.g., in inches and/or centimeters) fixed thereto so that the crown stop can quickly be set in position relative to the fence at the correct ceiling projection. In embodiments, the base or a non-movable portion of the table fixed to the base has a linear measurement scale (e.g., in inches and/or centimeters) is fixed relative to the base so that the movement of the table (and thus the fence) relative to the blade arbor (e.g., in the fully lowered position) can be set to the desired position and matched on both sides of the saw blade. There may be two linear measurement scales on the base, one on the left (for the left table and left fence) and one on the right (for the right table and right fence). In embodiments, the linear measurement scale fixed relative to the base is displayed on a non-movable portion of the table that is fixed relative to the base or displayed directly on a portion of the base.

In embodiments, the miter saw has at least one blade guard or shield that is coupled to the arm that extends circumferentially around the cutting edge of the blade. The blade guard can include multiple segments that pivot about the blade axis in opposite directions in response to pivotal movement of the arm in the plane of motion of the blade. In a covered or fully protective position of the guard, the guard may extend circumferentially about the front or forward half of the blade. Also, in embodiments, the guard may extend circumferentially about 270 degrees of the blade, i.e., measured clockwise from a right side or counterclockwise from a left side of the saw. The guard is configured to move into a retracted position as the arm and cutting blade are lowered. Specifically, the guard is configured to retract so that the entire rear half of the blade and the bottom half of the blade are exposed as the arm and cutting blade moved in an arc about the rear pivot. The front section of the blade can be guarded in a traditional means with a retracting guard as the blade lowers. The rear section can be guarded the same way with the guard retracting in the same direction or reverse direction with the movement of the blade or rear guard section can move vertically with linkage attached to the movement of the blade pivot action or may move up as it encounters the object to be cut.

BRIEF DESCRIPTION OF THE DRAWINGS

Prior art

Prior art

Prior art

DETAILED DESCRIPTION OF THE PREFERRED EMBODIMENTS

Figure 2A:
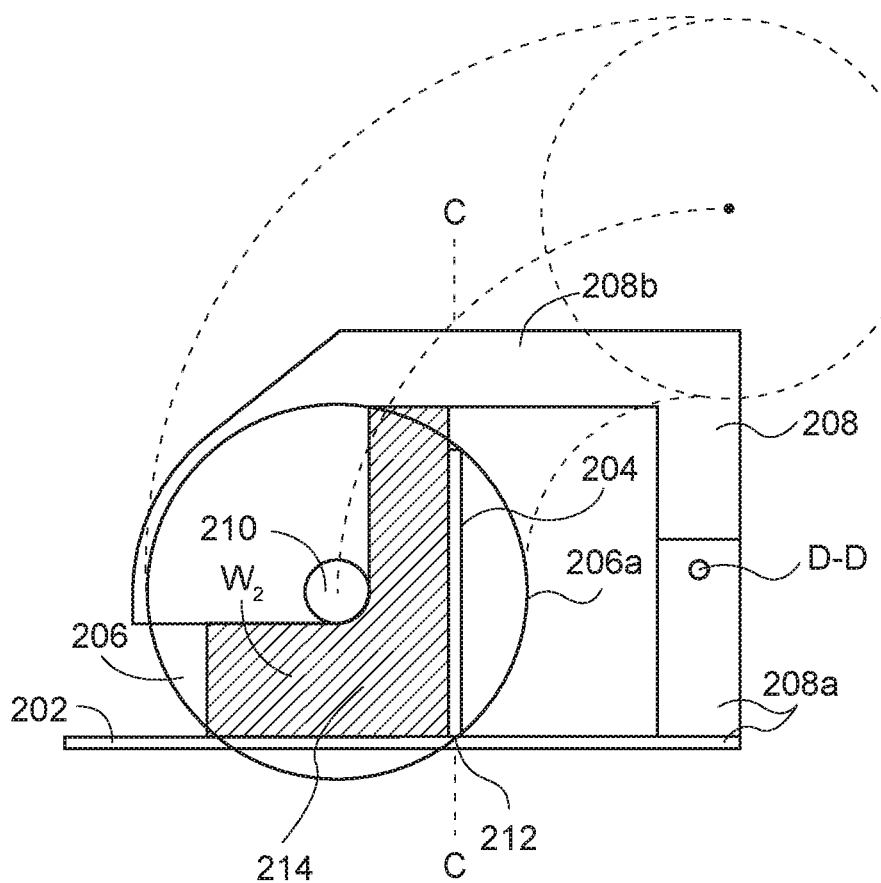
FIG. 2A is a schematic elevation view (right side) of a miter saw in accordance with an aspect of the disclosure with a fence in a first, forward position.
Figure 2B:
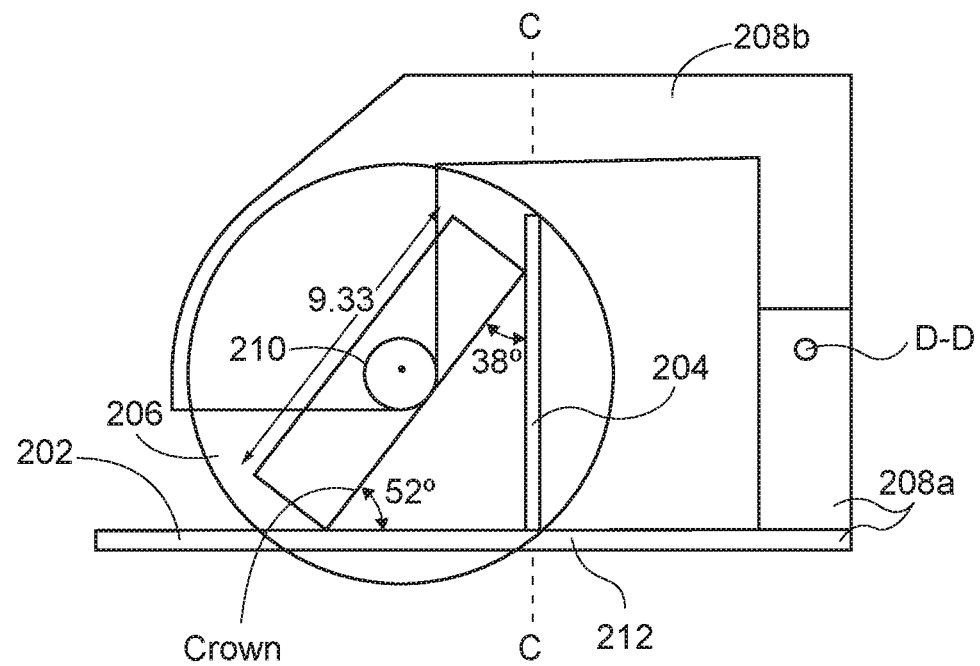
FIG. 2B shows the saw of FIG. 2A with the crown moulding of FIG. 1C set in the sprung position at a 38 degree spring angle.

FIGS. 2A and 2B shows a schematic elevation view of a miter saw 200 in accordance with an aspect of the disclosure. The saw 200 includes a table 202, a fence 204, a circular saw blade 206, and a support structure 208 for supporting the blade 206. The support structure 208 includes a base 208a and an arm 208b pivotally coupled to the base 208a to permit the arm 208b and blade 206 to pivot about a vertical axis C-C and a horizontal axis D-D (into the page in FIG. 2). This permits the blade 206 to be set at a certain miter angle about axis C-C and to move along a cutting path (e.g., an arc) when pivoting about an axis D-D. Specifically, the saw blade 206 moves between a first starting position (upper position of blade 206 in FIG. 2A in broken lines) to a second ending position (lower forward position of blade in FIG. 2A in solid lines). Between the first starting position and the second ending position, the blade 206 moves along a cutting pathway defined by the arm 208b pivoting in a vertical plane about axis D-D. In FIG. 2A the blade 206 can move in an arc about axis D-D between a first raised position (shown in broken lines) and a second lowered position shown in solid lines. A cutting zone in the pathway of the blade 206 is shown bounded by broken lines between the blade in the first and second positions.

In the schematic examples in FIGS. 1, 2A and 2B, the saw blades 106 and 206 have the same diameter, and the height of axis B-B above the table 102 is the same as the height of axis D-D above the table 202. As shown in FIGS. 2A and 2B, the vertical spacing between a bottom surface of arm 208b (above the rear half of the blade 206) and the top surface of table 202 is larger than the vertical spacing between a bottom surface of arm 108b (above the rear half of the blade 106) and the top surface of table 102. That is, in the second position of the blade 206, the bottom surface of the arm 208b that is rearward of the blade arbor 210 is higher above the table 202 than the bottom surface of arm 108b from the table 102. Specifically, the bottom surface of the portion of the arm 208b that is behind the rear half of the blade 206 is substantially (at least 90% of the height of the blade 206) above the top of the blade 206.

Figure 1A:
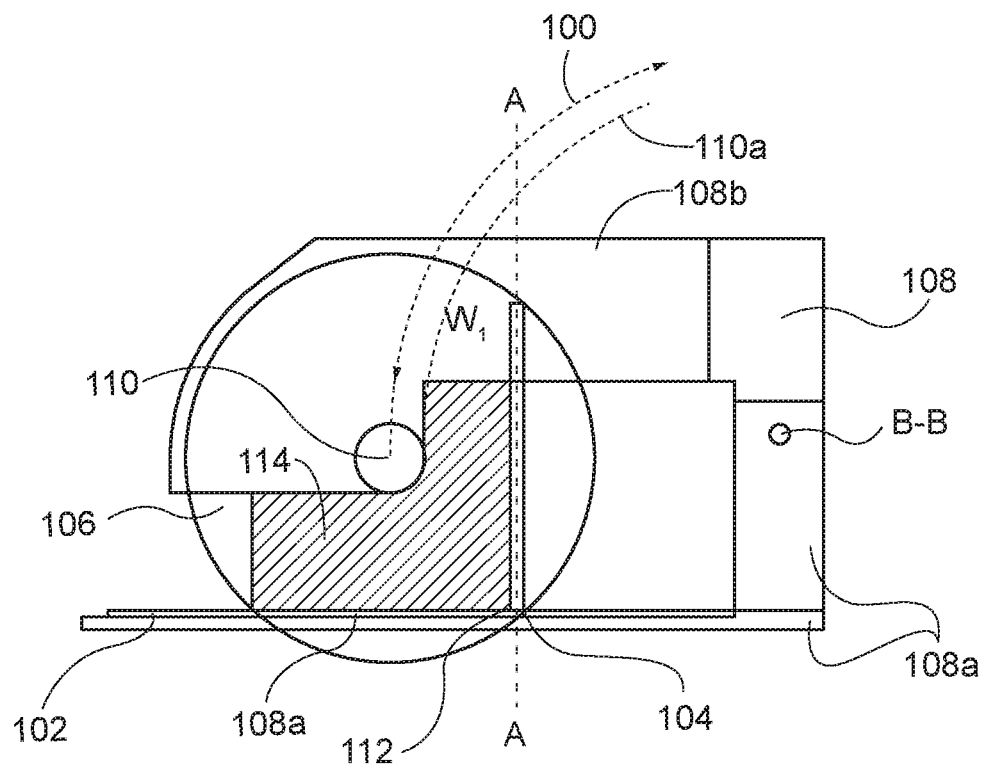
FIG. 1A is a schematic elevation (right side) view of a conventional miter saw.
Figure 1A:
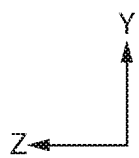
Figure 1B:
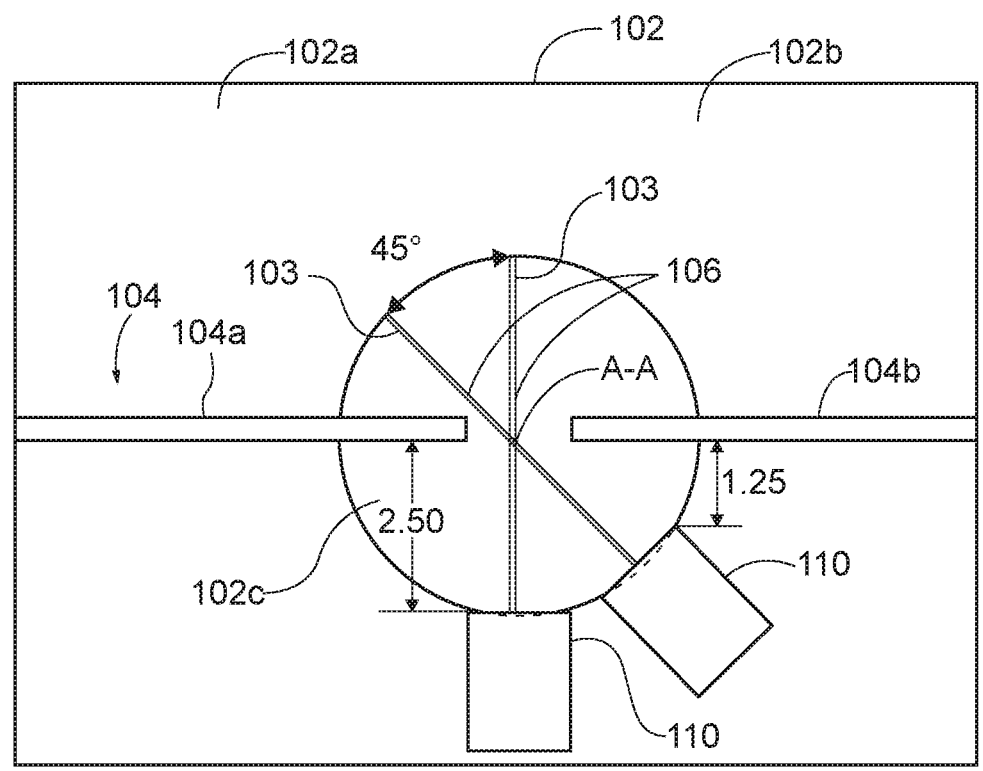
FIG. 1B is a top view of the miter saw of FIG. 1A.

In FIG. 2A, the horizontal spacing between the fence 204 and the blade arbor 210 is equal to the horizontal spacing between the fence 104 and the blade arbor 110 of blade 106 in FIG. 1A. However, owing to the raised bottom surface of the arm 208b, the height of a cutting area 214 within the cutting zone in FIG. 2A is larger than the height of cutting area 114 of saw 100 in FIG. 1A. Hence, the overall cutting area 214 of saw 200 is larger than the cutting area 114 of saw 100. This increase in cutting area 214 can be useful for cutting wider crown molding in position as well as cutting taller base molding in position standing up, as will be described in greater detail below.

Figure 4:
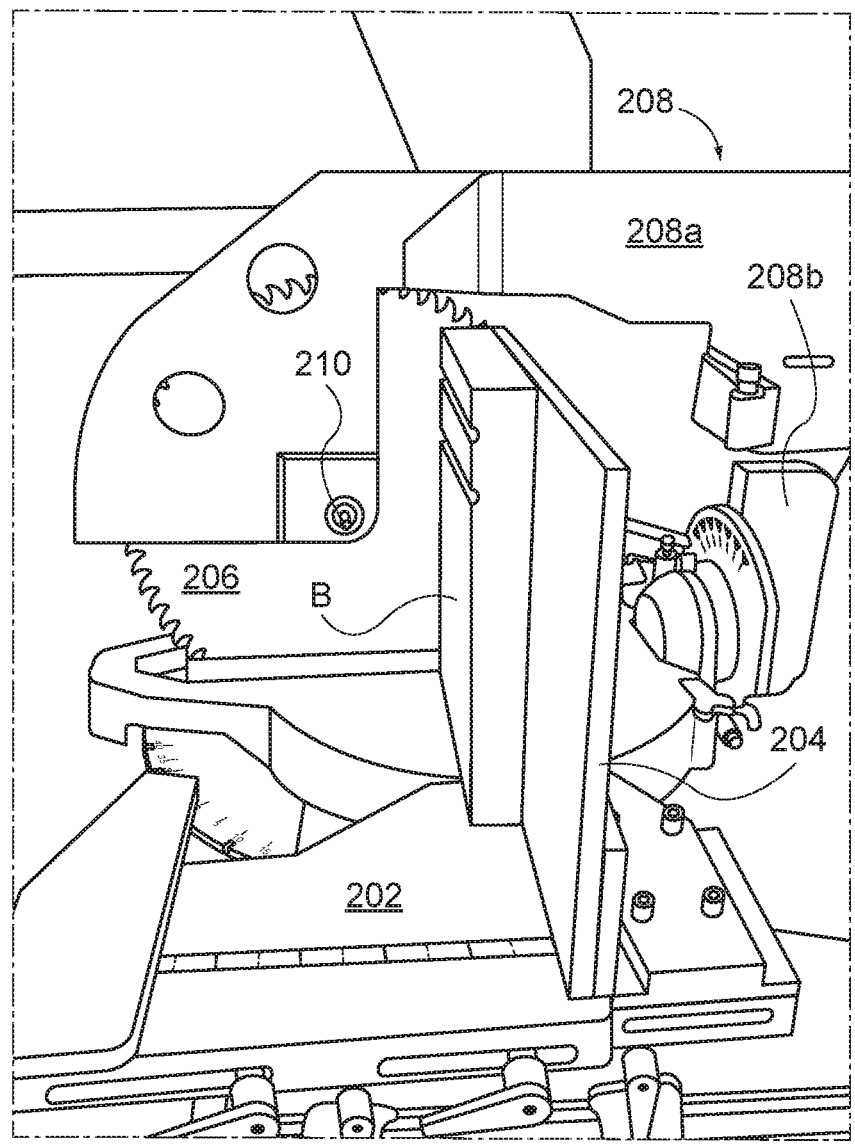
FIG. 4 shows an embodiment of a miter saw in accordance with this disclosure shown with a base moulding in an upright position.

As noted above, cutting base moulding in position is preferable because the arc that the blade 206 follows along its cutting path causes the blade 206 to cut the moulding from the top to the bottom of the workpiece (as well as from back to front), which is easier on the blade and the motor and does not require any bevel angle adjustments to make miter cuts. The raised height of the bottom surface of arm 208b in comparison to the bottom surface of the arm 108b permits taller base moulding to be cut in position or standing up. For example, FIG. 4 shows an example of the miter saw 200 configured in accordance with the description with a 12-inch blade 206 cutting a 9¼" tall base moulding in position with clearance between the top of the base moulding and the arm 208a when the blade 206 is in the second position.

In addition to an increase in height of a base moulding that can be cut in place standing up, the larger height of the bottom surface of arm 208b in FIG. 2A (in comparison to the bottom surface of arm 108) may permit an increase in the size (width) of crown moulding that can be cut in position depending on the moulding size (e.g., width) and shape (spring angle), with the limiting factor being clearance between the blade arbor 210 and the crown moulding when the saw blade 206 is in its final, second cut position. By way of example, the cross hatched lines in cut area 114 in FIG. 1A extend at a 45 degree angle with respect to the table 102 and the solid hatch line W1 that extends closest to blade arbor 110 extends a first distance. Thus, in FIG. 1A, the widest crown moulding that could be cut at a spring angle of 45 degrees would have a width equal to the first distance along line W1. In comparison, the cross hatched lines in cut area 214 extend at a 45 degree angle with respect to table 202 and the solid hatch line W2 extending closest to blade arbor 210 extends a second distance along line W2.

Figure 1C:
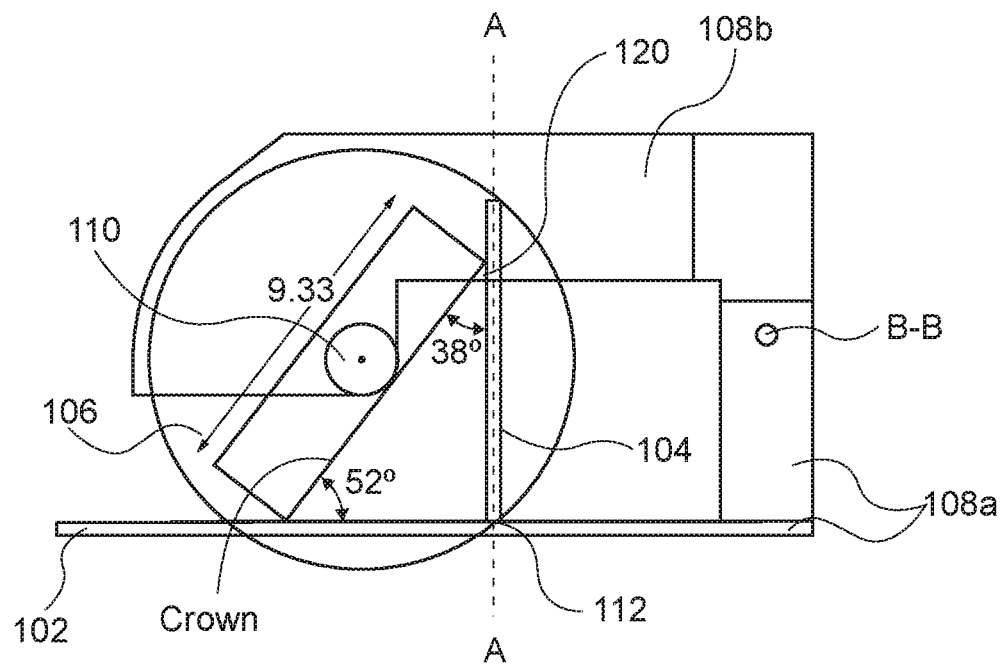
FIG. 1C is a right side view of the saw of FIG. 1A with a crown molding set in the sprung position at a 38 degree spring angle and showing a portion (upper right) that is outside the cut area of the saw.
Figure 1C:
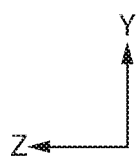

In FIGS. 1A and 2A, the two lines W1 and W2 are equal in length. In the example shown in FIG. 1C, a crown molding with a certain width (about 9.3 inches) that is larger than the distances of W1 and W2 is set in the sprung position at a spring angle of 38 degrees. However, as shown in FIG. 1C, the sprung crown moulding cannot clear the arm 108a when the arm 108b is in the second, final cut position. Specifically, a portion 120 of the crown moulding in the sprung position interferes with the arm 108b. In comparison, in FIG. 2B, the same crown moulding of FIG. 1C (having a width of about 9.3 inches) is set in the sprung position between the fence 204 and the table 202 of saw 200 at a spring angle of 38 degrees, and the crown moulding does have clearance under the arm 208b. Thus, the raised height of the bottom surface of arm 208b permits the saw 200 to accommodate and cut a wider crown moulding than the saw 100 in FIG. 1.

Other improvements can be made to increase the cutting capacity of saw 200 by increasing the horizontal spacing between the fence 204 and the blade arbor 210. For example, the fence 204 of saw 200 may optionally be configured to move relative to the base 208a along a fore and aft direction. It will be appreciated that configuring the fence 204 to be movable does not require the increase in height of the arm 208b discussed herein and that both improvements may be implemented independently.

Figure 2C:
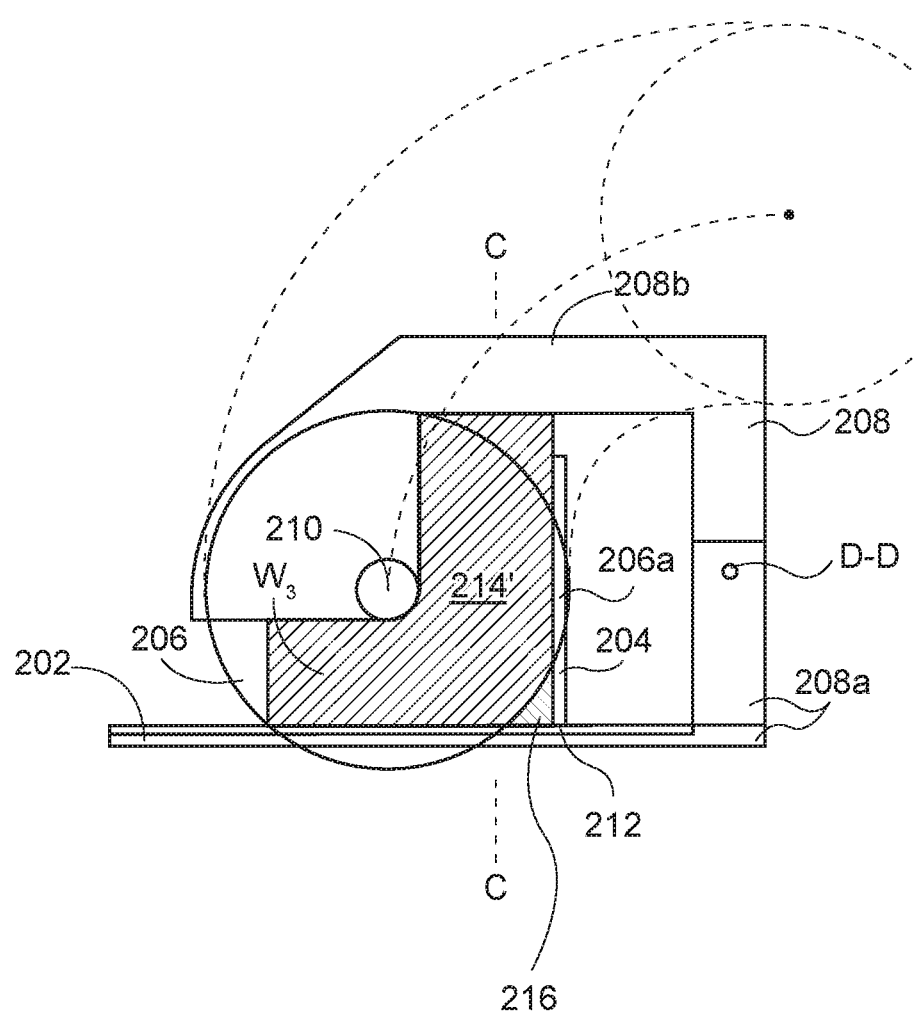
FIG. 2C shows the miter saw of FIG. 2A with the fence in a second position that is rearward of the first position in FIG. 2B.

In FIG. 2C, the fence 204 is moved rearward towards pivot D-D to a second position from a first forward position shown in FIG. 2A. In FIG. 2C, the fence 204 intersects the blade 206 near a point of tangency to the rear edge of the blade 206. As shown in FIG. 2C, a cut area 214' in the cutting zone of the blade 206 is wider (and thus larger) than the area 214 in FIG. 2A due to repositioning of the fence 204 further rearward to the second position. A solid cross hatched line W3 in area 214' in FIG. 2C (at 45 degree angle relative to the table 202) closest to blade arbor 210 extends a third distance that is larger than distances of W1 and W2. Thus, when the saw 200 is configured as in FIG. 2C, the saw 200 can cut a crown molding having a maximum width equal to the distance of W3 at a 45 degree spring angle, as is shown in FIG. 3A.

FIG. 2C also shows that if the fence 204 is moved too far rearward, an area 216 will be formed between the table/fence interface 212 and the blade 206 where the blade 206 cannot cut. This is due to the limitation of the plunge depth of the blade 206 in the second, final position of the blade 206. This issue may be relevant for cutting base molding in position. If a base moulding is placed against the fence 204 and table 202 at the table/fence intersection 212 shown in FIG. 2C, any portion of the moulding in area 216 will not be cut. To remedy this, a user can reposition the fence 204 in a forward direction a sufficient amount so that the base moulding workpiece is located fully within the cut area 214. In the example of FIG. 4, the fence 204 is positioned sufficiently forward with respect to the blade arbor 210 so that the base moulding workpiece, in its upright position, is fully within the cut area 214, and is not in area 216.

Figure 3A:
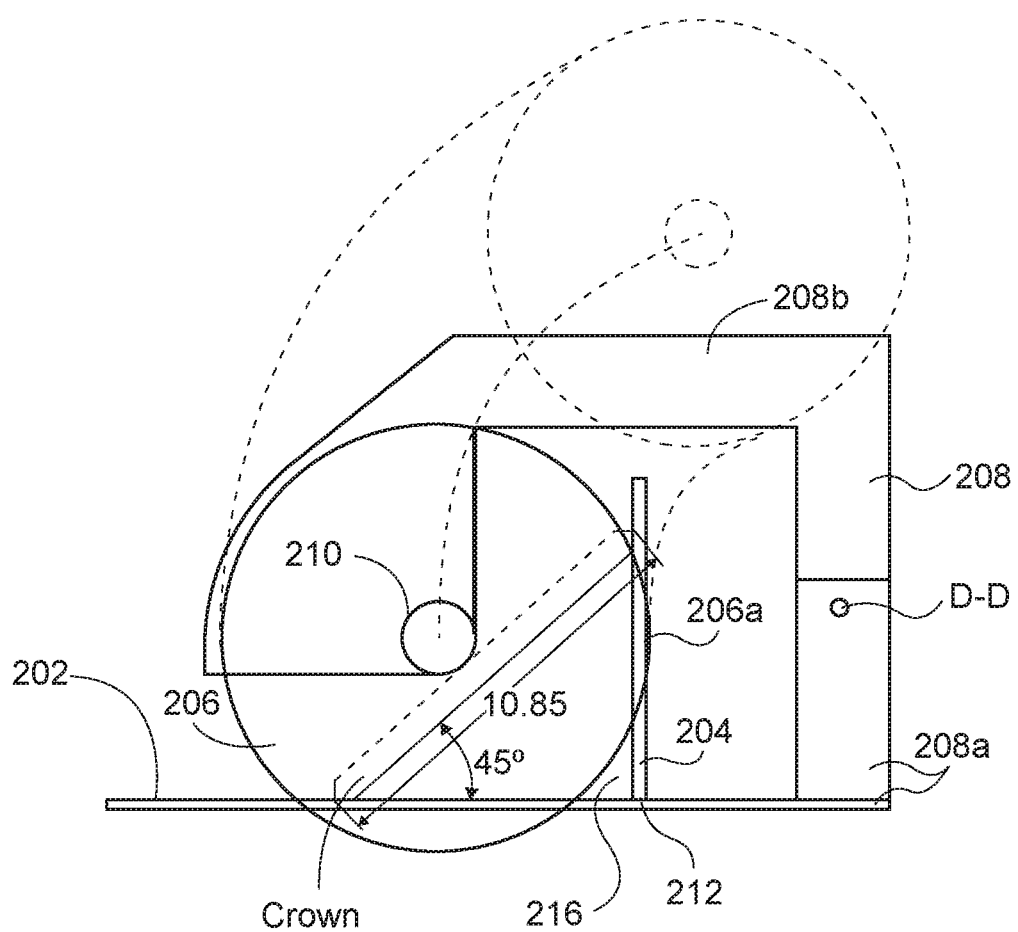
FIG. 3A is a schematic elevation view (right side) of the miter saw of FIG. 2C, with the fence in the second position, and with a crown moulding shown in the sprung position at a spring angle of 45 degrees.

FIG. 3A shows the saw 200 with the fence 204 adjusted to the second position shown in FIG. 2C and with a crown moulding (having a width of about 10.85 inches) workpiece in the sprung position between the fence 204 and table 202. As shown in FIG. 3A, it will be appreciated that the area 216 will not pose a problem for the cutting crown moulding in position since the moulding is located entirely within the cut area 214.

In FIG. 3A, when the blade 206 is in the second cut position and the fence 204 is in its second position, there is no interference between the blade arbor 210 and the crown moulding workpiece. In FIG. 3A the fence 204 is located substantially at the rear edge of the blade 206 such that the blade 206 will be able to cut through the upper edge of the crown molding while the moulding is at the 45 degree spring angle. Due to the 45 degree spring angle and the horizontal spacing of the blade arbor 210 relative to the fence 204, it is not possible to cut a wider crown molding (at the same spring angle) at the second position shown.

Nonetheless, it may be possible to cut a slightly wider crown molding than the moulding shown in FIG. 3A by adjusting (i.e., raising) the position of the saw blade 206 in the second, final cut position. For example, the saw 200 in FIG. 3A may have a depth stop to adjust the plunge depth of the blade 206 below the surface of the table 202. The plunge depth can be adjusted, e.g., to raise the height of the arbor 210 in the second position, to a position where the blade 206 cuts completely through the crown moulding in the sprung position without causing interference between the arbor 210 and the crown moulding. It will be appreciated that for a given horizontal spacing between the arbor 210 and the fence 204, there will be a limit to decreasing the plunge depth (i.e., raising the height of the arbor 210) to increase the width of cut for cutting crown moulding in the sprung position. That is, for a given horizontal spacing between the arbor 210 and the fence 204, there is a maximum width of crown molding that can be cut at a given spring angle even after the plunge depth is minimized. Thereafter, a wider crown moulding having the same spring angle would cause interference between the blade arbor 210 and the crown moulding. However, it will be appreciated that for wider crown molding with the same spring angle, it may be possible to cut the wider crown moulding using the saw 200 by moving the fence 204 further rearward from the second fence position in FIG. 3A to a third fence position shown in FIG. 3B.

Figure 3B:
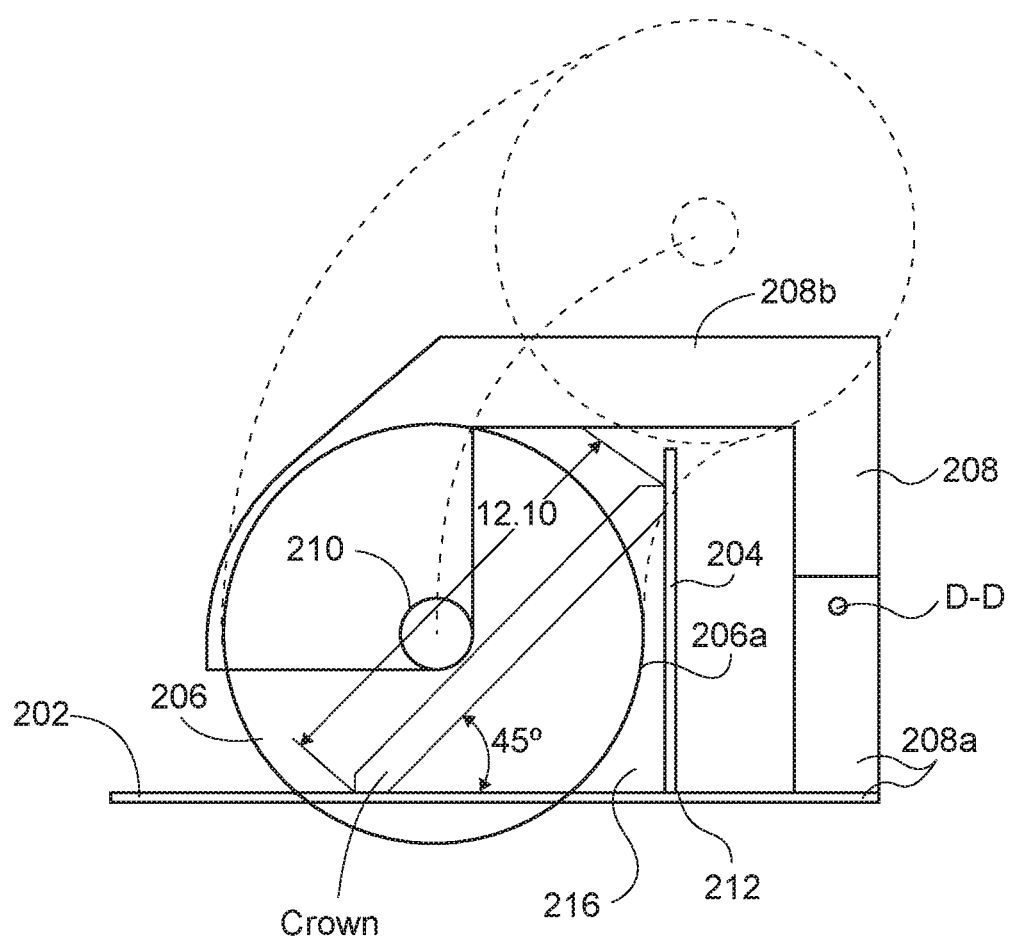
FIG. 3B shows the miter saw of FIG. 2C with the fence positioned in a third position that is further rearward of the second position, and with another crown moulding (wider than the moulding shown in FIG. 3A) shown in the sprung position at a spring angle of 45 degrees. The third position is horizontally spaced behind the rear edge of the saw blade, but is still in a cutting zone of the saw blade.

In FIG. 3B, the fence 204 is horizontally spaced between the rear edge 206a of the blade 206 and the pivot point D-D. The crown molding (having a width of about 12.1 inches) in FIG. 3B is wider than the crown moulding in FIG. 3A. As a result of the adjusted position of the fence 204, the wider crown moulding in FIG. 3B can be completely cut by the saw 200 without any interference between the moulding and the blade arbor 210, as shown by the lines in FIG. 3B representing the blade pathway between the first position of the blade 206 and the second position of the blade 206.

Figure 3C:
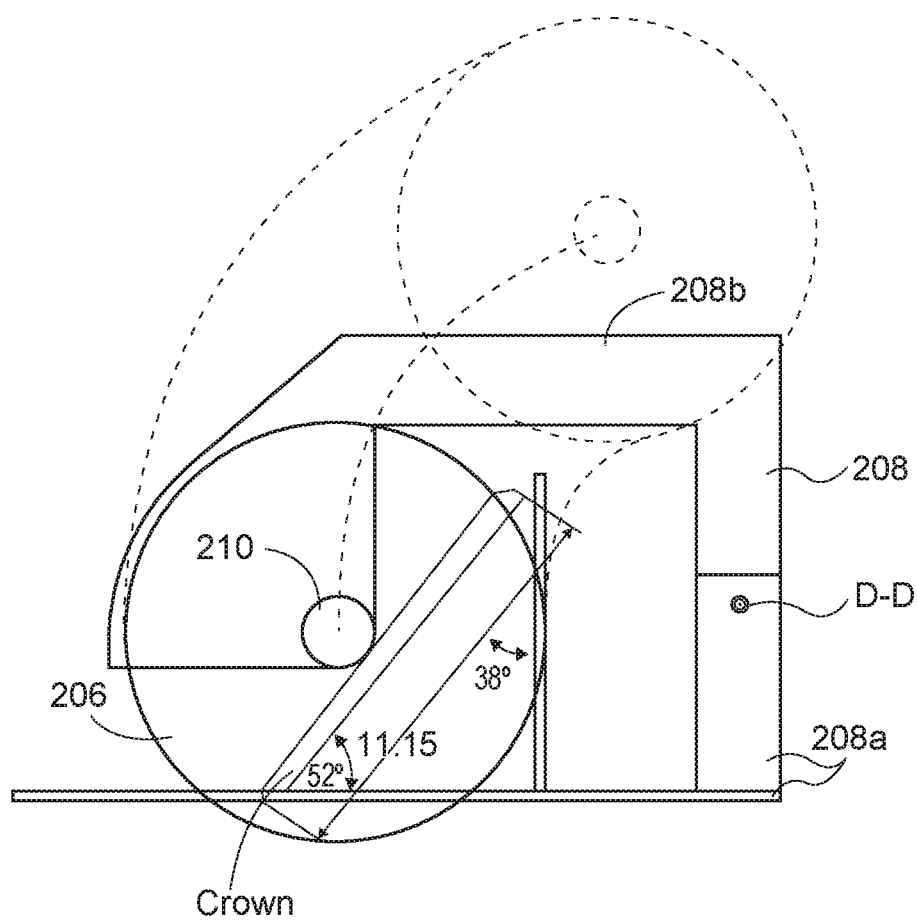
FIG. 3C shows the miter saw of FIG. 3A, with the fence in the second position, and with another crown moulding (wider than the moulding shown in FIG. 3A) shown in a sprung position at a spring angle of 38 degrees.

Also, even with the fence 204 set to the second position, it may be possible for the saw 200 to cut a wider crown moulding than that shown in FIG. 3A. For example, FIG. 3C shows the saw 200 with the fence 204 set to the second position and with a crown moulding having a spring angle of 38 degrees set in the sprung position between the fence 204 and the table 202. The crown moulding (having a width of about 11.1 inches) in FIG. 3C is wider than the moulding (having a width of about 10.85 inches) in FIG. 3A. As shown by the lines in FIG. 3C representing the path of the blade 206, the blade 206 is capable of cutting completely through the wider moulding in FIG. 3C and without any interference between the arbor 210 and the moulding.

Figure 3D:
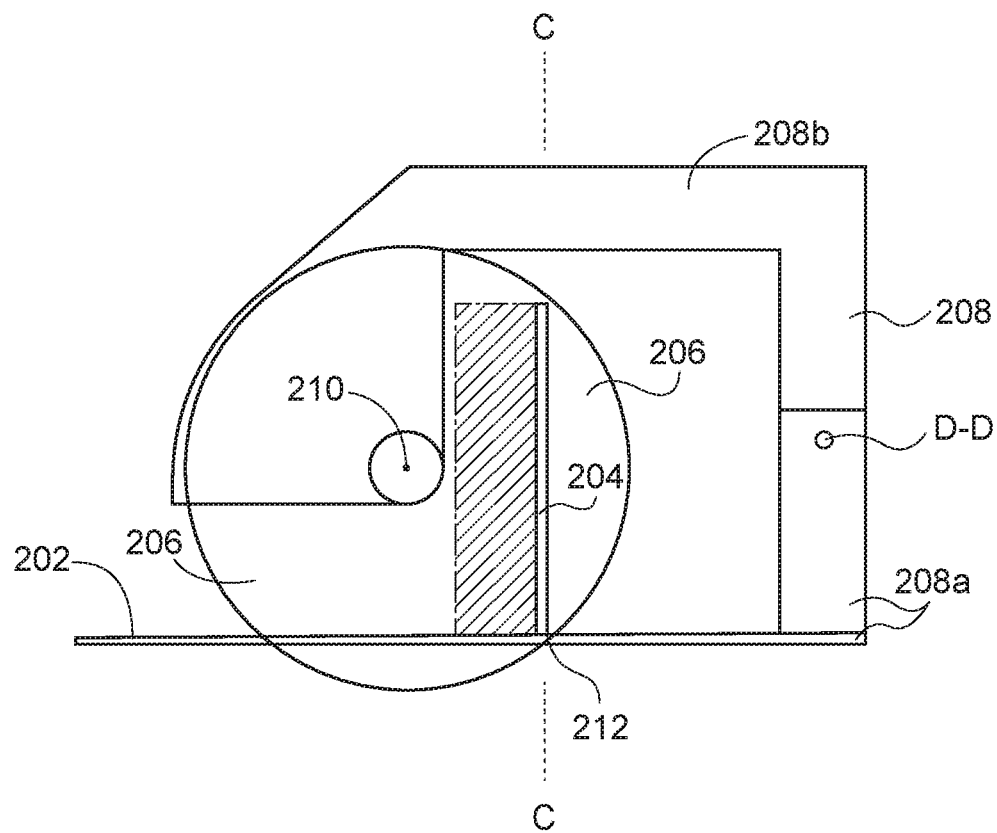
FIG. 3D shows the miter saw of FIG. 3A with the fence set in the first position in FIG. 2B and with a base moulding in position showing a an upper left corner of the moulding that interferes with an arc of the arbor.

Thus, altering the horizontal spacing between the blade arbor 210 and the fence 204 can alter the amount of the rear portion of the blade 206 used in a cut. Such alteration can be used advantageously for configuring the saw 200 to cut various base moulding and crown moulding that are larger than those that could be cut with saw 100. Increasing the horizontal distance between the fence 204 and blade arbor 210 will increase the size of crown moulding that can be cut in position, with the limiting factor being clearance between the moulding and the support arm 208b and/or blade arbor 210. However, increasing the horizontal distance between the blade arbor 210 and the fence 204 can hinder the ability of the blade 206 to cut through a board (e.g. base moulding) standing up, because the blade 206 may not cut through the fence/table intersection 212. This can be seen in FIG. 3D where the arc of the arbor 210 would interfere with the upper left edge of the base moulding to be cut in position. On the other hand, moving the fence 204 further rearward from the position in FIG. 3D may create clearance between the arbor 210 and the upper left edge of the base moulding, but may create a non cut zone (e.g., 216) down at the table/blade intersection. This problem may be resolved by adjusting the second ending position height of the saw blade 206 (i.e., by adjusting the plunge depth) to cut further through the table/blade intersection. However, it will be appreciated that it may not be possible to increase the plunge depth beyond a certain depth due to possible interference between the blade 206 and structure of the base 208a beneath the table 202 that may be in the path of the blade 206. Specifically, the blade 206 cannot be lowered to a depth that would cause the blade 206 to contact any structure of the saw 200, such as the pivot through which axis C-C extends.

While adjustment of the fence 204 alone is one way to adjust the horizontal distance between the blade arbor 210 and the fence 204, other or additional adjustments are possible to adjust the desired horizontal distance. For example, to increase the horizontal distance between the fence 204 and the blade arbor 210, a user can move the fence 204 rearward, move the pivot point D-D with support arm 208b and blade arbor 210 forward, move the blade arbor 210, or any combination of the above to thereby use more of the rear half of the blade, which would otherwise be located behind the fence 204. Furthermore, with modifications to both the height of the arm 208b and the horizontal distance between the fence 204 and the blade arbor 210, the saw 200 will utilize the full cutting capacity of the saw blade 206 for a respective saw configuration, as shown for example in FIGS. 5 to 7.

Figure 5:
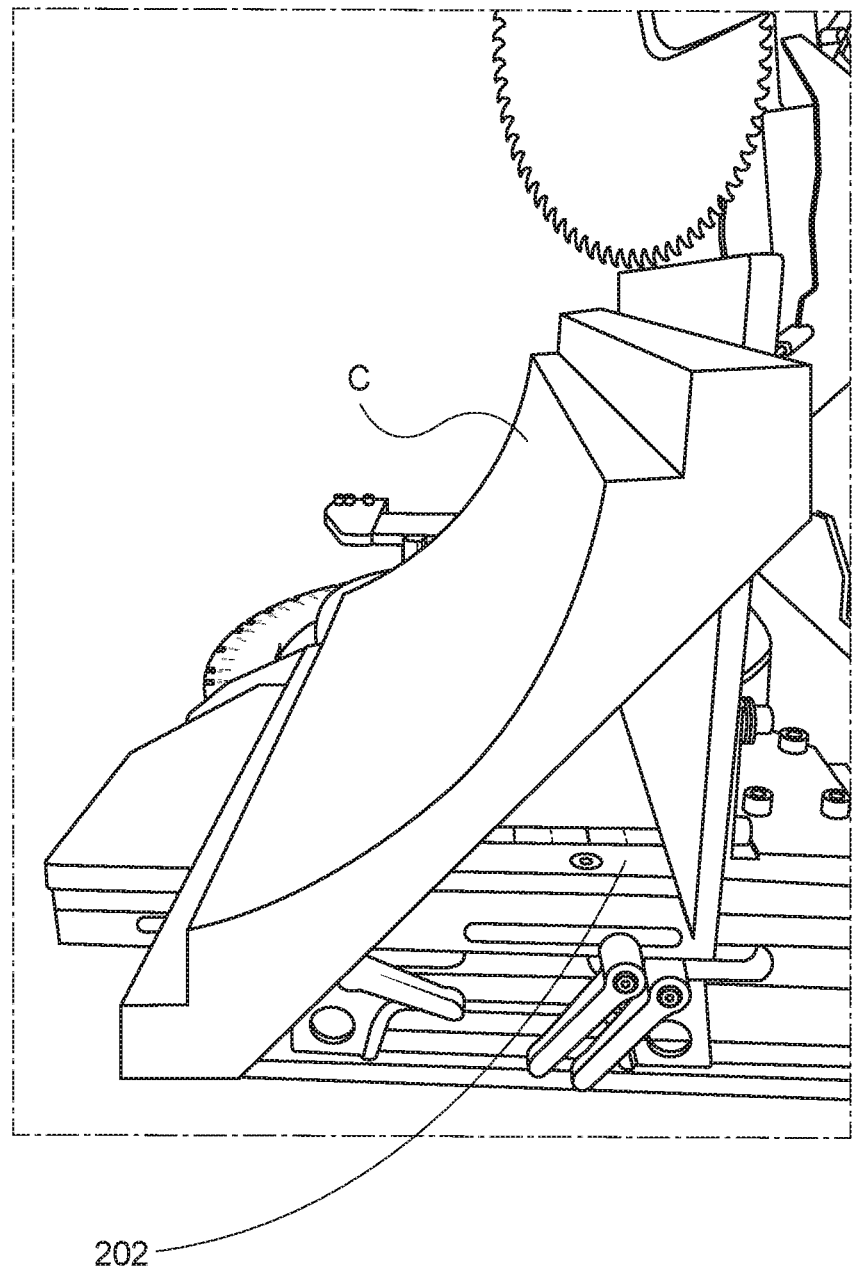
FIG. 5 shows the miter saw of FIG. 4 with a crown moulding placed in the sprung position with the saw blade raised to a first, starting position of a miter cut.
Figure 6:
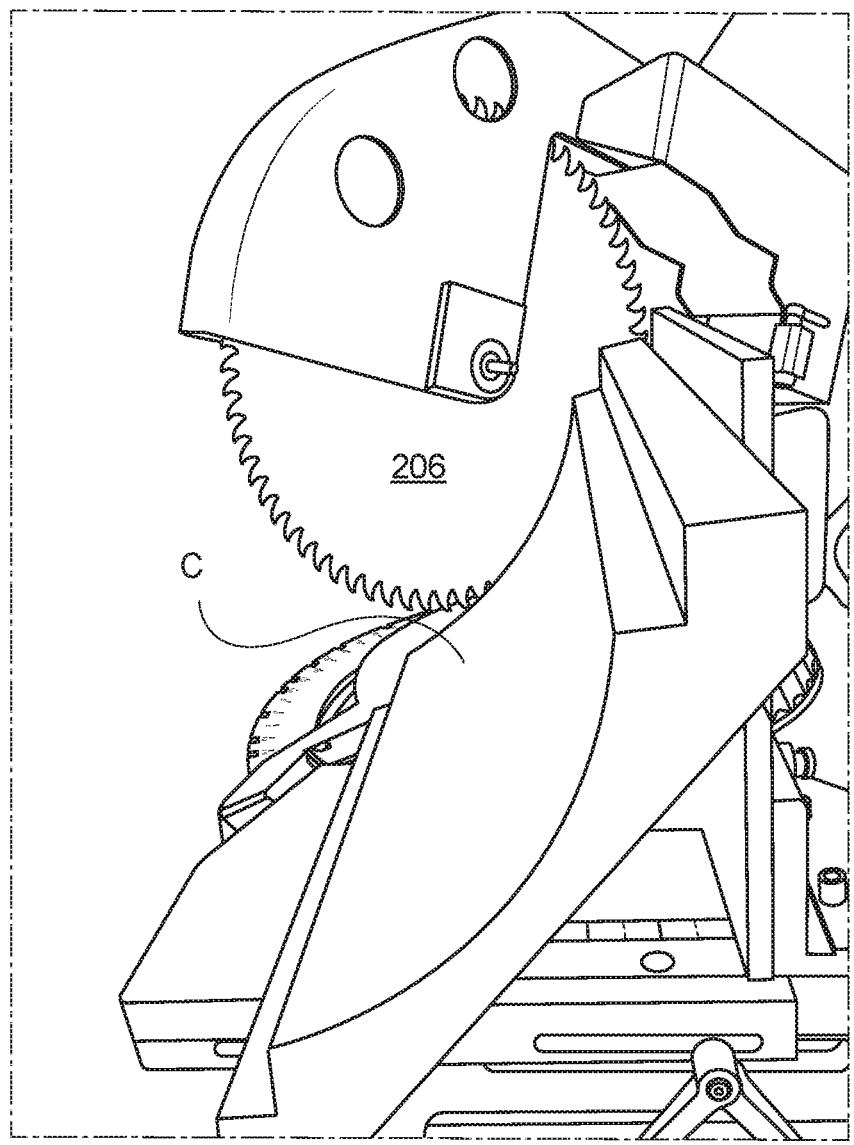
FIG. 6 shows the miter saw of FIG. 4 with the saw blade lowered to an intermediate position of the miter cut.
Figure 7:
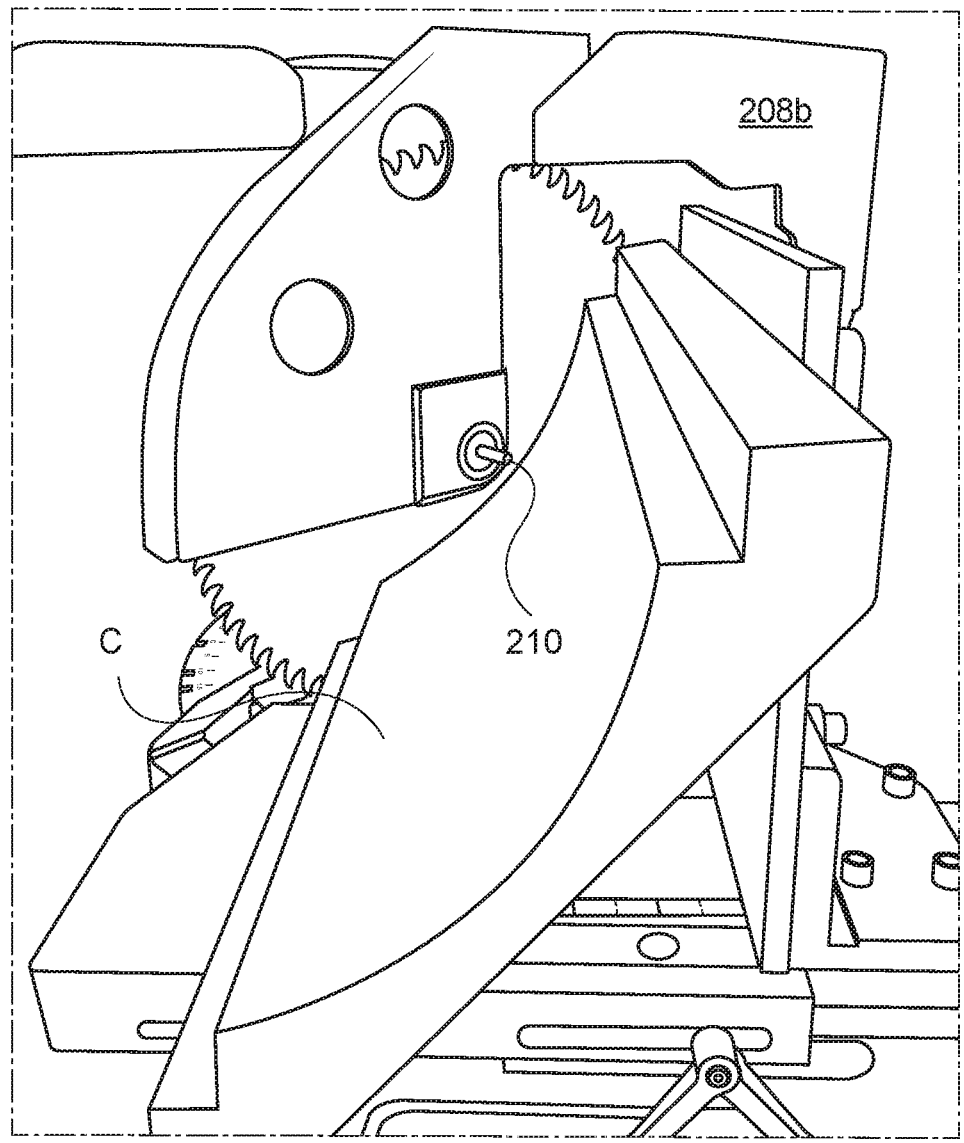
FIG. 7 shows the miter saw of FIG. 5 with the saw blade lowered to a second, final position of the miter cut.

In FIGS. 5 to 7, the movable fence 204 is positioned fully rearward for making miter cut to a 10½ inch wide crown moulding in position with a 12-inch saw blade 206. In FIG. 5, the blade 206 is at a first starting position above the workpiece and positioned to begin cuts from above the top of the moulding in a downward direction. FIG. 7 shows the blade 206 in its second ending position where the blade 206 cuts completely through the moulding with clearance between the moulding 206 and the arbor 210 and the arm 208b. FIG. 6 shows the blade in an intermediate position of the cut between the starting and ending positions.

Figure 8:
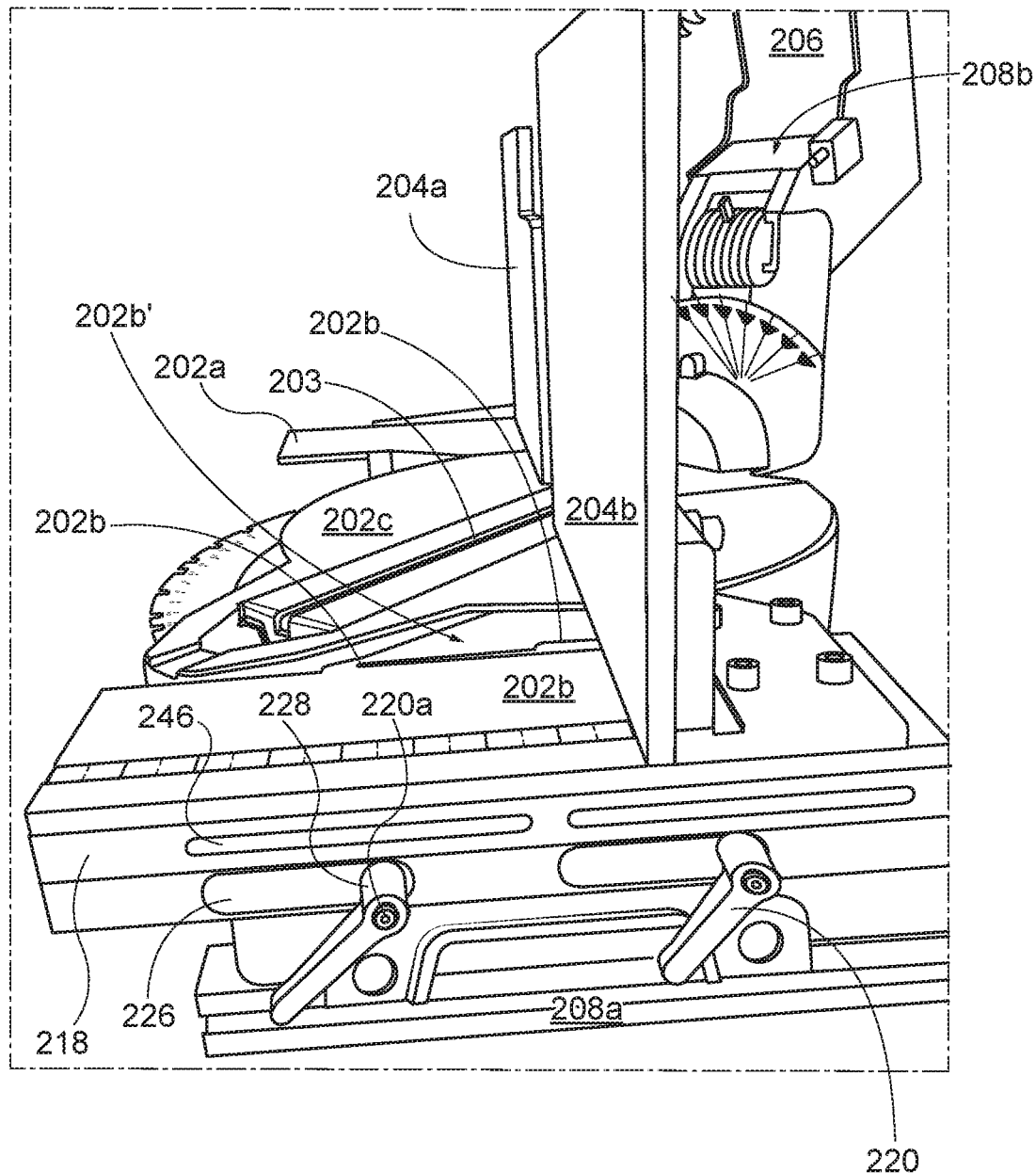
FIG. 8 shows the miter saw of FIG. 4 with two table fences adjusted to be coplanar.
Figure 9:
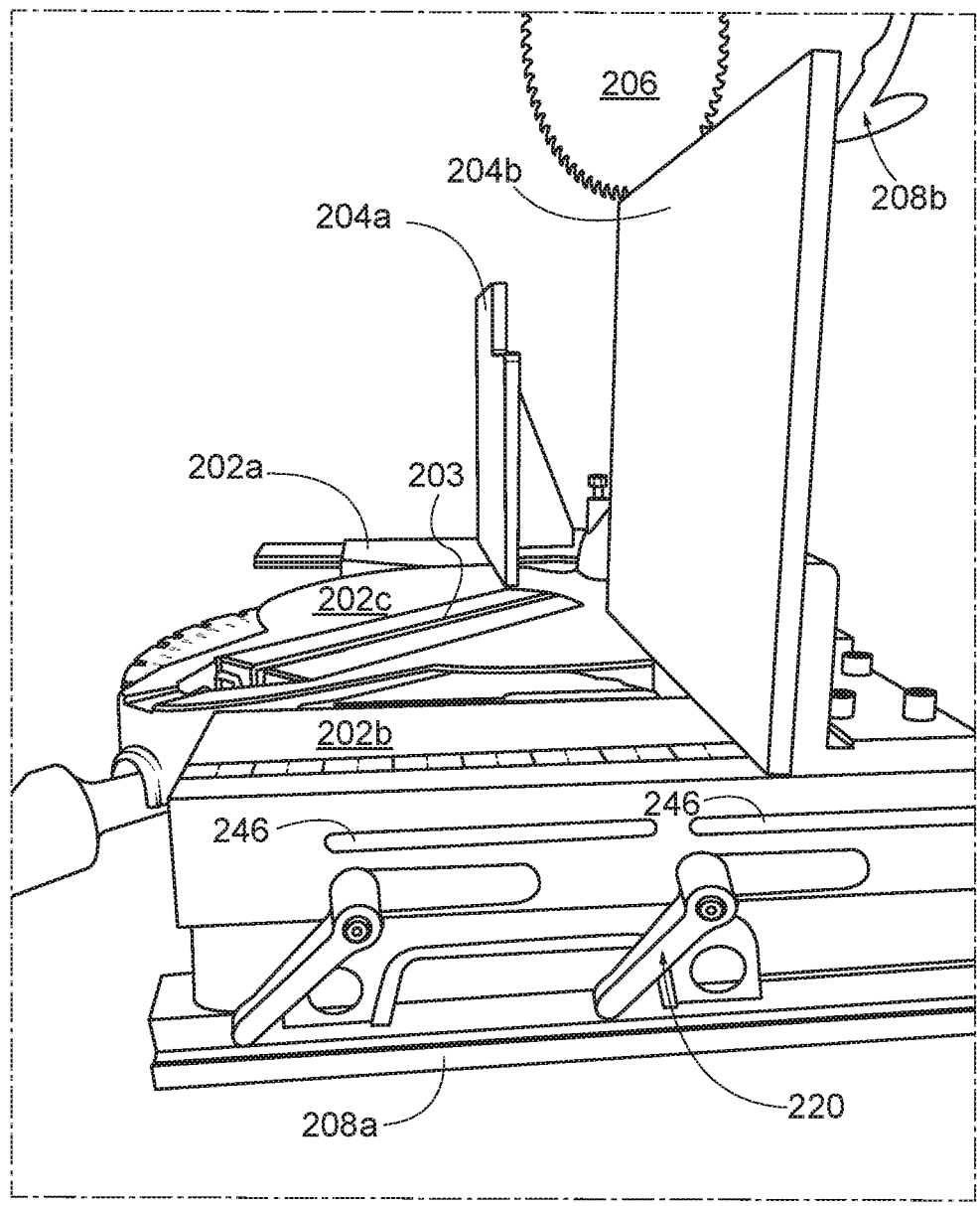
FIG. 9 shows the miter saw of FIG. 4 with two table fences adjusted in offset position relative to one another.

FIGS. 8 and 9 show the saw 200 with the arm 208b and blade 206 at the first initial cut position and with the arm 208b and the blade 206 rotated about axis C-C into a mitered position at about 45 degrees. The table 202 includes a left table 202a and a right table 202b. The tables 202a, 202b are configured to slide fore and aft relative to the base 208a.

As shown more closely in FIG. 8, the base 208a has rails 218 extending in the fore and aft direction and the tables 202a and 202b each have a bottom that rides on the rails 218 to permit relative sliding movement of the tables 202a and 202b in the fore and aft direction relative to the base 208a. The rails 218 also define side holes 228 to receive threaded bolts 220a of clamps 220. The sides of the tables 202a, 202b define elongated slots 226 through which the bolts 220a of the clamps 220 extend. The slots 226 extend along the fore and aft direction and the ends of the slots define the range of relative motion between the tables 202a, 202b and the base 208a. When the bolts 220a of the clamps 220 are tightened, the tables 202a, 202b become frictionally engaged and secured to the base 208a in whatever relative fore and aft position is set. The bolts 220a of the clamps 220 can be loosened to permit the tables 202a, 202b to freely slide fore and aft for repositioning relative to the base 208a.

The fence includes a left fence 204a and right fence 204b. The left table 202a is fixed to the left fence 204a and the right table 202b is fixed to the right fence 204b. Each table/fence pair 202a/204a and 202b/204b is configured to move unitarily with respect to the base 208a in a fore/aft direction for adjustment of the fences 204a/204b relative to the base 208a. The position of each table/fence pair with respect to the base 208a can be locked or released with the clamps 220 as described above. In FIG. 8, the left fence 204a and right fence 204b are aligned in coplanar manner. The left table/fence 202a/204a and the right table/fence 202b/204b are independently movable relative to each other and the base 208a. For example, in FIG. 9 the left fence 204a is offset (in the fore/aft direction) from the right fence 204b.

FIGS. 8 and 9 also show additional details of the table 202. The table 202 includes a central portion 202c that swivels in unison with the arm 208b and the blade 206 about axis C-C. The central portion 202c defines a central slot 203 configured to receive a bottom portion of the blade 206 when the blade is in the second position. The central portion 202c swivels to set the saw blade 206 for a miter cut. Between the central portion 202c and the left and right tables 202a, 202b there are left and right fixed table portions 202a' and 202b' that are fixed to the base 208a and cannot be moved relative to the base 208a. In embodiments, the fixed table portions 202a' and 202b' are integral with the base 208a. Linear measurement scales 202a" and 202b" are affixed (only scale 202b" is shown in FIGS. 8 and 9) to the left and right fixed table portions 202a' and 202b' so that rearward displacement of the fences 204a, 204b relative to the base 208a can be measured.

Figure 10:
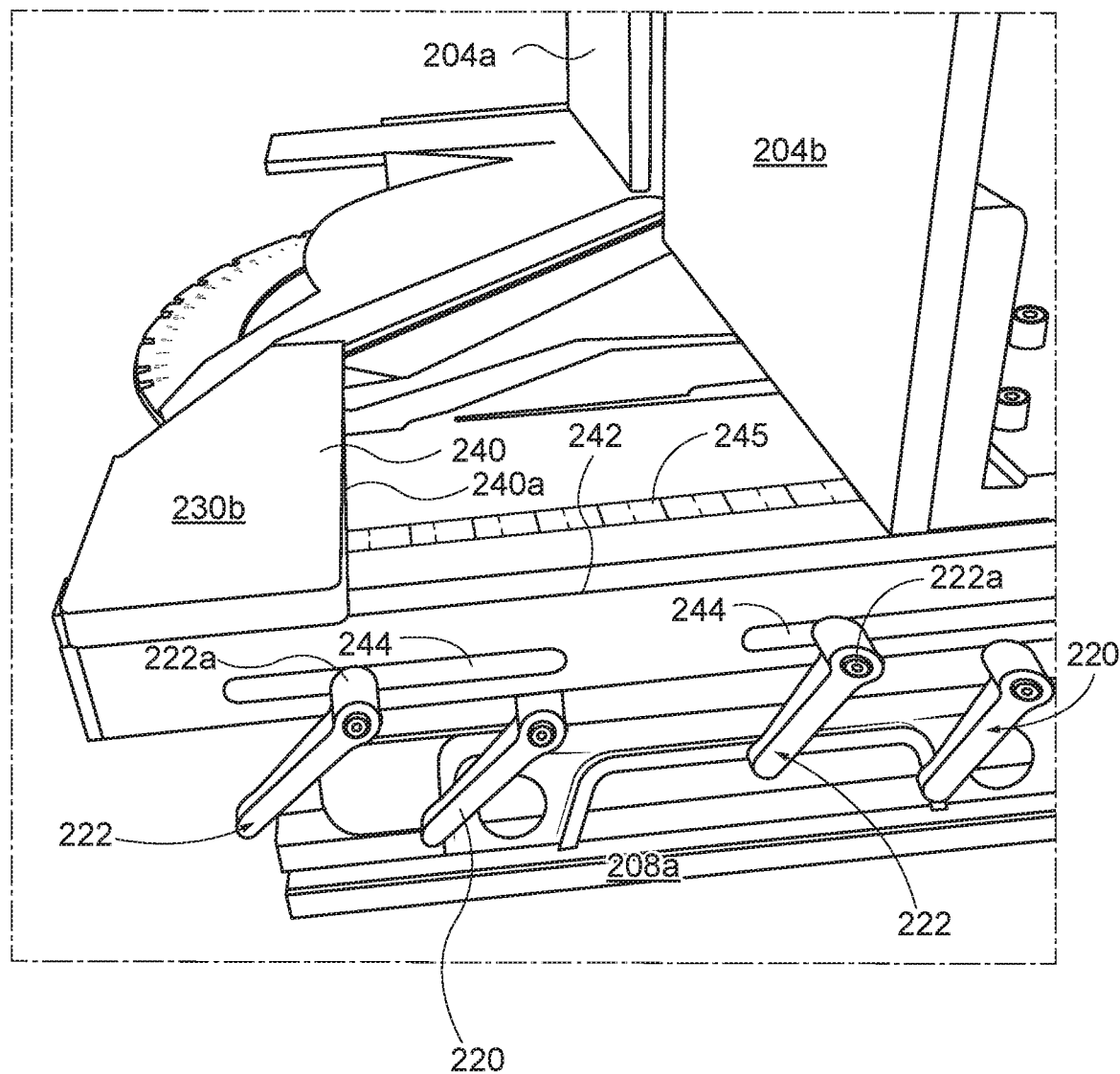
FIG. 10 shows the miter saw of FIG. 8 with a crown stop attached to the right table.
Figure 11:
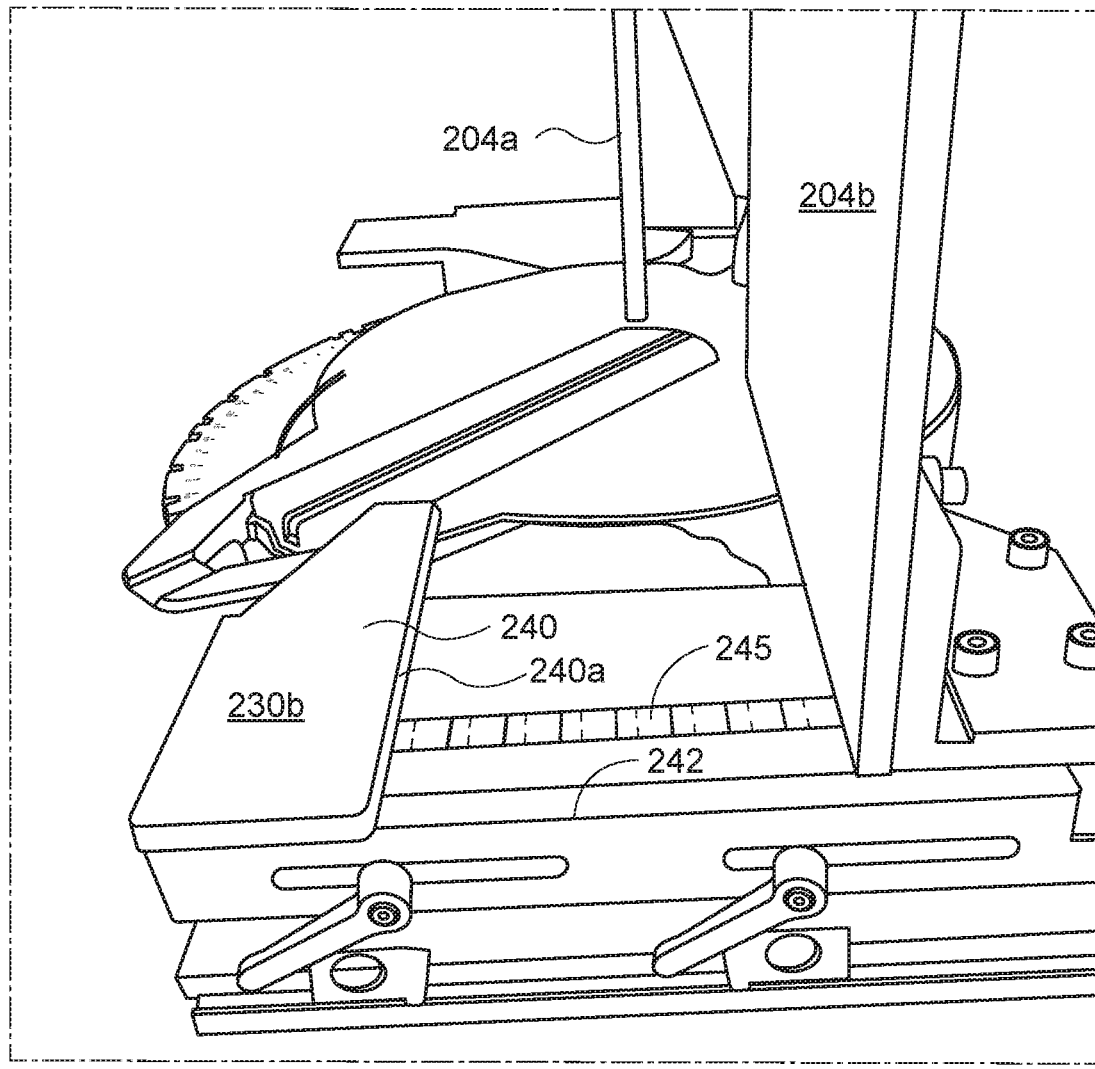
FIG. 11 shows the miter saw of FIG. 9 with a crown stop attached to the right table.

FIGS. 10 and 11 show, respectively, the miter saw 200 of FIGS. 8 and 9 with a crown stop 230b clamped to the right table 202b with clamps 222. A corresponding crown stop 230 can also or alternatively be clamped to the left table 202a, though not shown in FIGS. 10 and 11. Clamps 222 are provided for securing and releasing the crown stop to the right table 202b. Once the crown stop 230b is secured to the right table 202b, the entire assembly of the crown stop, right table 202b, and right fence 204b can be unitarily moved fore/aft relative to the base 208a for adjustment by releasing the clamps 220 and sliding the entire assembly fore and aft, as shown in FIG. 11.

The crown stops 230a, 230b are configure to slide fore and aft relative to the tables 202a, 202b and fences 204a, 204b. The crown stops 230a, 230b are mirror images of one another so a further description of crown stop 230b will apply equally to crown stop 230a.

Figure 12:
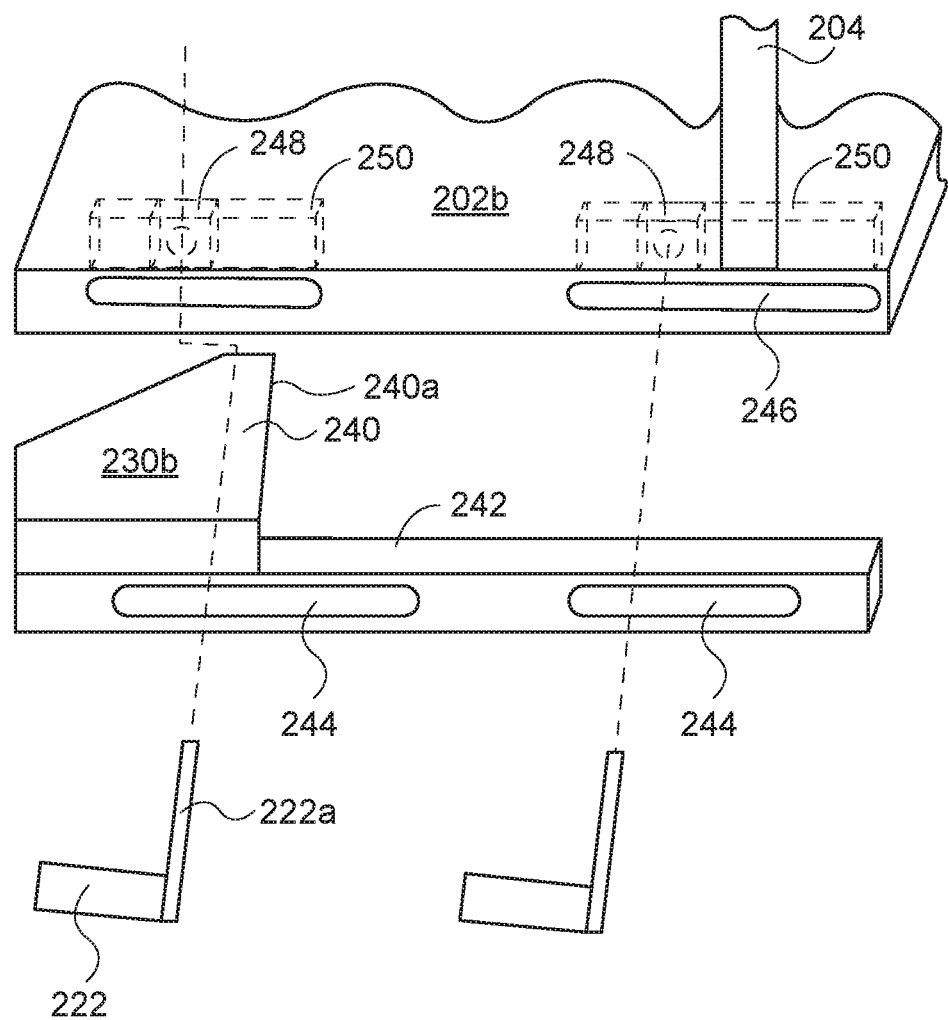
FIG. 12 shows details of an embodiment of a connection arrangement between the crown stops and tables shown in FIGS. 10 and 11.

As shown in FIG. 12, the crown stop 230b is generally L-shaped, with a first portion 240 that is configured to sit directly on the upper surface of the table 202b and has a rear facing surface 240a opposite and parallel with an opposite surface of the fence 204b. The crown stop 230b also has a second portion 242 that extends at a right angle to the rear facing surface 240a. The second portion 242 is elongated in the fore and aft direction and defines elongated slots 244 that are configured to overlap with elongated slots 246 (FIG. 9) formed in the sides table 202b. The table 204a includes threaded nuts 248, which may be captured in respective elongated slots 250 aligned with slots 246 so that the nuts 248 cannot separate from the table 204a. The nuts 248 are configured to travel (e.g., slide) in slots 250 the length of the elongated slots 246 in the table 204a. Bolts 222a of the clamps 222 extend through the overlapping elongated slots 244 and 246 and thread respectively with the threaded nuts 248. The elongated slots 246 and 244 extend along the fore and aft direction and the ends of the slots 246 and 244 define a full range of relative motion between the first portion 240 of the crown stop 230b and the fence 204b. When the bolts 222a of the clamps 222 are tightened, the second portion 242 becomes frictionally engaged with the side of the table 202b in whatever relative fore and aft position is set. The bolts 222a of the clamps 222 can be loosened to permit the crown stop 230b to freely slide fore and aft for repositioning relative to the fence 204b.

As shown most clearly in FIGS. 10 and 11, the right table 202b has a linear measurement scale 245 affixed thereto for setting the relative distance between the crown stop 230 and the right fence 204b. As shown in FIG. 11, the relative distance between the crown stop 230 and the right fence 204b that is set in FIG. 10, remains unchanged when the right table 202b and right fence 204b are moved rearward from the initial position in FIG. 10.

The saw 200 can be used to cut crown moulding in position (i.e., in the sprung position) by first measuring the ceiling projection of the crown moulding, such as with a framing square, and then adjusting the distance between the crown stops 230 and the fences 204a, 204b to the measured ceiling projection using the linear measurement scales 245 on the tables 202a, 202b. A user can then place the crown moulding workpiece in position between the crown stops 230 and the fences 204a, 204b on the saw, which can be aligned as discussed herein. The user can adjust the miter angle as needed. The user can then adjust the fences fore or aft, as necessary, to ensure that the blade 206 will cut completely through the crown moulding and without any interference between the blade arbor and the moulding.

The saw 200 may have additional features to facilitate use. For example, the fences 204a, 204b may have notches along their tops that may have depth and width suitable for a user to place their fingers when a user wishes to additionally hold the moulding workpiece against the fence during a cut. Also, to help ensure that the workpiece being cut is horizontally level with the table, the forward facing surface of the fences 204a, 204b may have one or more horizontal lines at various heights to permit the user to visually check that the workpiece placement is correct. In one embodiment, a plurality of regularly and/or irregularly spaced parallel lines may be displayed on the fences 204a, 204b. Also, as a further measurement guide, a linear scale extending in the vertical direction may be displayed on the forward facing surfaces of the fences 204a, 204b.

The saw 200 can be used to cut base moulding in position by aligning the fences 204a, 204b and then placing the base moulding in its upright position against the fences 204a, 204b. The user can adjust the fences 204a, 204b fore or aft, as necessary, to ensure that the blade 206 will cut completely through the base moulding without any interference between the blade arbor 210 and the moulding along the entire cutting path of the blade from the first to the second positions. For a thick, tall base moulding where the fences 204a, 204b have to be moved rearward to create clearance for the saw arbor 210, it may be necessary to adjust the plunge depth for arm 208b as described above so that the saw blade 206 may travel farther below the surface of the table 102 to ensure that the blade 206 will cut through the table-fence intersection, and, therefore, completely through the moulding.

There have been described and illustrated herein several embodiments of a saw and a method of operating the saw. While particular embodiments have been described, it is not intended that the invention be limited thereto, as it is intended that the invention be as broad in scope as the art will allow and that the specification be read likewise. Thus, while the particular miter saw disclosed has not been described as having a compound miter saw function, it will be appreciated that the miter saw may indeed be configured as a compound miter saw to enable the blade to make bevel cuts. Also, while the arm of the miter saw described herein has been described as only moving in vertical plane in a pivoting motion, it will be appreciated that in alternative embodiments, the arm may also slide within the plane along a predefined path as the arm pivots. For example, in one embodiment, the arm and rear pivot point may be attached to the base with a double jointed mount that may permit the arm and rear pivot point to move forward and aft within a vertical plane as well as pivot about a horizontal axis in the vertical plane. In such an embodiment, a pin may be attached to the arm and the pin may travel in a fixed slot that defines a path for the pin, and thus the arm to follow. The path defined by the slot may have a linear portion to cause the arm to both move fore and aft as well as a curved or angled portion to cause the arm to pivot in the vertical plane of the arm, e.g., to follow the spring angle of a crown, cut in position. In other embodiments, the arm is configurable to move the blade in substantially a linear path. For example, the arm may be configured to slide along rails at an angle relative to the base. The angle may be user-adjustable so that a cutting path will be defined that intersects the workpiece to cut fully through the workpiece. For example, for crown moulding held in position, the angle of the rails may be set to be parallel with the spring angle so that the crown moulding will be cut diagonally from the top down along the width of the moulding. In addition, while particular types of saw blade drive arrangements have been disclosed, it will be understood that other arrangements can be used. For example, and not by way of limitation, belt or gear drives. It will therefore be appreciated by those skilled in the art that yet other modifications could be made to the provided invention without deviating from its spirit and scope as claimed.

What is claimed is:

1. A miter saw comprised of:
   a base;
   a horizontal table supported by the base, the table having an upper surface;
   a fence coupled relative to the table and extending vertically upward from the table and being located between the rear edge of the blade arbor and the rear pivot point when the blade is driven, the fence configured to move for and aft relative to the base between a forwardmost position and a rearmost position;
   a support arm pivotably coupled to the base at a rear pivot point configured to permit the arm to pivot about a horizontal axis;
   a circular saw blade arbor supported by the support arm at a location spaced forward from the rear pivot point; and
   a circular saw blade supported by and concentric with the blade arbor, the saw blade configured to be rotatably driven to cut a workpiece supported on both the horizontal table and the fence, the saw blade having a rear edge facing the rear pivot point,
   wherein the pivotal coupling at the rear pivot point permits the blade to move along a predetermined arc in a vertical plane perpendicular to the horizontal table from a vertically elevated first position in which a bottom of the blade is higher than the rear pivot point to a vertically lower second position in which the bottom of the saw blade extends below the upper surface of the table, and
   wherein between the rear edge of the blade arbor and the fence in the rearmost position of the fence, the support arm extends substantially above the height of the saw blade to allow clearance to cut the workpiece without interference from the support arm as the saw blade is moved along the predetermined arc and substantially all of the saw blade height between the rear edge of the blade arbor and the rear edge of the saw blade and in front of the fence is exposable to pass through the cut workpiece.

2. The miter saw according to claim 1, wherein:
   the arm and the blade are configured to rotate together about a vertical axis.

3. The miter saw according to claim 1, further comprising:
   a linear measurement scale displayed on a portion of the table that is fixed relative to the base, said scale indicating a measured displacement of the fence relative to the table.

4. The miter saw according to claim 1, further comprising:
   a crown stop displaceably coupled to the fence; and
   a linear measurement scale indicating a measured displacement of the crown stop relative to the fence.

5. The miter saw according to claim 1, wherein:
at least one fence extending vertically from a portion of the table and forming the fence forms an intersection with the table, the fence and table defining surfaces against which a material to be cut is supported, the at least one fence moveable in a fore and aft direction relative to the base between the rear edge of the blade arbor and rear pivot point,
the fence having at least one configuration relative to the table such that when the saw blade is rotated completely through the predetermined arc and extends at least partially below the table, the saw blade does not pass through the intersection.

6. The miter saw according to claim 5, further comprising:
a crown stop coupled to the at least one moveable fence and moveable relative to the at least one fence, wherein the crown stop is adapted to be moved fore and aft as the at least one fence is moved fore and aft.

7. The miter saw according to claim 6, further comprising:
a linear measurement scale displayed on a moveable portion of the table, said scale indicating a measured displacement of the moveable crown stop relative to the at least one fence.

8. In a miter saw comprised of a base, a horizontal table supported by the base, an arm pivotably coupled to the base at a rear pivot point configured to permit the arm to pivot about a horizontal axis, and a circular saw blade arbor supported by the arm at a location spaced forward from the rear pivot point, and a circular saw blade supported by and concentric with the blade arbor, the saw blade configured to be driven to cut a workpiece on the horizontal table, the workpiece being a crown molding positioned in a sprung position between the fence and the table, wherein the rear pivot point permits the blade to move along a predetermined arc in a vertical plane perpendicular to the horizontal table, the predetermined arc extending from a first position in which the blade arbor is located above the rear pivot point to a second location in which the blade arbor is located in front of the rear pivot point and the saw blade passes through a slot in the table to a set distance below the table, a vertical pivot setting a miter angle to the saw blade, the improvement comprising:

a fence extending from the table and forming an intersection with the table, the fence and table defining surfaces against which a material to be cut is supported, the surface of the fence defining a plane, wherein the fence displaceable fore and aft relative to the base between the rear edge of the blade arbor and the rear pivot point, the fence having at least one configuration such when the saw blade is rotated completely through the predetermined arc, the saw blade passes through the plane of the fence, but does not pass through the intersection, and completely cuts the workpiece while the material is supported against the surfaces of the table and the fence.

9. The improvement according to claim 8, wherein:
the at least one fence and the table are moveable together in a fore and aft direction relative to the base.

10. The improvement according to claim 8, further comprising:
a linear measurement scale indicating a measured displacement between the at least one fence and the base.

11. The improvement according to claim 10, further comprising:
a crown stop displaceably coupled to the at least one fence, wherein the crown stop is configured to move fore and aft relative to the at least one fence.

12. The improvement according to claim 11, wherein:
the crown stop is adapted to be moved fore and aft as the at least one fence is moved fore and aft.

13. The improvement according to claim 12, further comprising:
a linear measurement scale indicating a measured displacement of the crown stop relative to the at least one fence.

14. The improvement according to claim 8, wherein:
the arm extends substantially above the height of the blade to allow substantially all of the blade area both rearward of and vertically above and below the rear edge of the blade arbor to be able to move through the cut workpiece when the blade is not driven.

\* \* \* \* \*